United States Patent
Novet

(10) Patent No.: US 10,359,929 B2
(45) Date of Patent: Jul. 23, 2019

(54) SLIDER AND GESTURE RECOGNITION USING CAPACITIVE SENSING

(71) Applicant: ANALOG DEVICES, INC., Norwood, MA (US)

(72) Inventor: Isaac Chase Novet, Carlsbad, CA (US)

(73) Assignee: ANALOG DEVICES, INC., Norwood, MA (US)

( * ) Notice: Subject to any disclaimer, the term of this patent is extended or adjusted under 35 U.S.C. 154(b) by 480 days.

(21) Appl. No.: 14/936,360

(22) Filed: Nov. 9, 2015

(65) Prior Publication Data

US 2017/0131891 A1    May 11, 2017

(51) Int. Cl.
G06F 3/0488    (2013.01)
G06F 3/044    (2006.01)
G06F 3/041    (2006.01)

(52) U.S. Cl.
CPC .......... *G06F 3/04883* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 3,732,369 A * | 5/1973 | Cotter | G06F 3/044 178/20.04 |
| 8,169,421 B2 | 5/2012 | Wright et al. | |
| 8,479,122 B2 | 7/2013 | Hotelling et al. | |
| 8,749,523 B2 | 7/2014 | Pance et al. | |

(Continued)

FOREIGN PATENT DOCUMENTS

| | | |
|---|---|---|
| CN | 102246125 A | 11/2011 |
| CN | 104662491 A | 5/2015 |

(Continued)

OTHER PUBLICATIONS

Designing a Multi-Purpose Capacitive Proximity Sensing Input Device, Conference Paper, Jan. 2011, DOI:10.1145/2141622.2141641, Source DBLP, Research Gate, http://www.researchgate.net/publication/221410403, 9 pages.

(Continued)

*Primary Examiner* — Patrick N Edouard
*Assistant Examiner* — Peijie Shen
(74) *Attorney, Agent, or Firm* — Patent Capital Group

(57) ABSTRACT

Conventional user interface for sensing gestures often require physical touching of a sensor pad, or an area filled with sensor pads. These conventional sensor pads take up precious real estate on a compact mobile device, interferes significantly with other components of the mobile device, complicates design, consumes power, and adds costs to the final product. With two or more small capacitive sensing electrodes placed on a mobile device (arbitrarily or with far less restrictions), capacitive sensing can provide a virtual sensor pad as a user interface. By implementing an algorithm which detects for three different conditions, the virtual sensor pad can be used effectively as a user interface modality to detect gestures such as a sliding gesture, drawing gesture, letters, writing, etc. The resulting virtual sensor pad can flexibly change to different desirable locations, and no longer suffers from the limitations of the conventional sensor pad.

20 Claims, 17 Drawing Sheets

(56) References Cited

U.S. PATENT DOCUMENTS

| | | | |
|---|---|---|---|
| 8,878,438 | B2 | 11/2014 | Salter et al. |
| 9,189,093 | B2* | 11/2015 | Ivanov ............... G06F 3/044 |
| 2004/0140956 | A1* | 7/2004 | Kushler ............. G06F 3/04883 |
| | | | 345/168 |
| 2006/0288313 | A1* | 12/2006 | Hillis ................ G06F 3/04883 |
| | | | 715/863 |
| 2009/0008161 | A1 | 1/2009 | Jones et al. |
| 2009/0020343 | A1 | 1/2009 | Rothkopf et al. |
| 2009/0265671 | A1* | 10/2009 | Sachs ..................... G06F 3/017 |
| | | | 715/863 |
| 2010/0315337 | A1 | 12/2010 | Ferren et al. |
| 2013/0018489 | A1 | 1/2013 | Grunthaner et al. |
| 2013/0106704 | A1* | 5/2013 | Vidal .................... G06F 3/0219 |
| | | | 345/169 |
| 2013/0127783 | A1* | 5/2013 | Lee ......................... G06F 3/043 |
| | | | 345/175 |
| 2013/0257781 | A1* | 10/2013 | Phulwani ............... G06F 3/044 |
| | | | 345/173 |
| 2014/0005034 | A1 | 1/2014 | Wohl et al. |
| 2014/0050354 | A1* | 2/2014 | Heim ................. G06K 9/00335 |
| | | | 382/103 |
| 2014/0101619 | A1* | 4/2014 | Kaldor .................. G06F 3/0418 |
| | | | 715/863 |
| 2014/0267152 | A1 | 9/2014 | Curtis |
| 2015/0097809 | A1* | 4/2015 | Heim .................... G06F 3/0416 |
| | | | 345/174 |
| 2015/0149801 | A1* | 5/2015 | Vandermeijden ... G06F 3/04883 |
| | | | 713/323 |
| 2015/0233998 | A1* | 8/2015 | Chen .................... G01R 31/086 |
| | | | 324/764.01 |
| 2015/0248166 | A1* | 9/2015 | Mayanglambam ..... G06F 3/017 |
| | | | 345/173 |
| 2015/0316572 | A1* | 11/2015 | Kimura ..................... G01P 3/36 |
| | | | 356/28 |
| 2016/0004433 | A1* | 1/2016 | Wang ................. G06F 3/04883 |
| | | | 715/773 |
| 2017/0293362 | A1* | 10/2017 | Heim ....................... G06F 3/017 |
| 2017/0298242 | A1* | 10/2017 | Mostowy-Gallagher .................... |
| | | | C09D 11/101 |
| 2017/0308287 | A1* | 10/2017 | Shafi ................... G06F 3/04883 |

FOREIGN PATENT DOCUMENTS

| | | |
|---|---|---|
| CN | 104937438 A | 9/2015 |
| WO | 2011/023856 | 3/2011 |

OTHER PUBLICATIONS

Capacitive Sensor-Based Hand Gesture Recognition in Ambient Intelligent Scenarios, Conference Paper, May 2013, DOI: 10.1145/2504335.2504340, Research Gage, http://www.researchgate.net/publication/262390782, 5 pages.

Fatemeh Aezinia et al., Three Dimensional Touchless Tracking of Objects Using Integrated Capacitive Sensors, IEEE Transactions on Consumer Electronics, vol. 58, No. 3, Aug. 2012, 5 pages.

Hardware Design for Capacitive Touch, AN0040—Application Note, EFM ®32, Silicon Labs, Sep. 16, 2013, 22 pages.

Ning Jia, ADI Capacitance-to-Digital Converter Technology in Healthcare Applications, Analog Dialogue 46-05, May 2012, www.analog.com/analogdialogue, 3 pages.

How to Design a PresSense Pressure Touch Button, AN3431 Application Note, Sep. 2011, www.st.com, 18 pages.

Cooler Master Staff, Hybrid Capacitive Switch, Oct. 9, 2014, 6 pages, www.cmu.coolermaster.com/hybrid-capacitive-switch.

Shruti Hanumanthaiah et al., Mechanical Buttons to Capacitive Sensing—A Step-by-Step Guide—Part I, EDN Network, Mar. 25, 2013, 6 pages.

Shruti Hanumanthaiah et al., Mechanical Buttons to Capacitive Sensing—A Step-by-Step Guide—Part II, EDN Network, Apr. 21, 2013, 6 pages.

Tobias Grosse-Puppendahl et al., OpenCapSense: A Rapid Prototyping Toolkit for Pervasive Interaction Using Capacitive Sensing, 2013 IEEE International Conference on Pervasive Computing and Communications (PerCom), San Diego, CA Mar. 18-22, 2013, 8 pages.

Jun Rekimoto, SmartSkin: An Infrastructure for Freehand Manipulation on Interactive Surfaces, CHI 2002, Apr. 20-25, 2002, Minneapolis, MN © 2001 ACM 1-58113-453-3/02/0004, 8 pages.

Ilya Rosenberg et al., The UnMousePad—An Interpolating Multi-Touch Force Sensing Input Pad, © 2009 ACM 0730-0301/2009/03-ART65, DOI: 10-1145/1531326.1531371, ACM Transactions on Graphics, vol. 28, No. 3, Article 65, Publication date: Aug. 2009, 10 pages.

Raphael Wimmer et al., Thracker—Using Capacitive Sensing for Gesture Recognition, Proceedings of the 26th IEEE International Conferene on Distributed Computing Systems Workshop (ICDCSW'06), 0/7695-2541-5/06, © 2006 IEEE, 6 pages.

Raphael Wimmer et al., A Capacitive Sensing Toolkit for Pervasive Activity Detection and Recognition, retrieved Jul. 27, 2015, 10 pages.

Mariel Van Tatenhove et al., Using Capacitive Sensor User Interfaces in Next Generation Mobile and Embedded Consumer Devices, Dec. 5, 2006, www.embedded.com/print/4006757, 6 pages.

* cited by examiner

◯ = ELECTRODE
▭ = DEVICE

SLIDER AND GESTURE RECOGNITION USING CAPACITIVE SENSING

TECHNICAL FIELD OF THE DISCLOSURE

The present invention relates to the field of integrated circuits, in particular to providing slider and other gesture recognition using a low complexity capacitive sensing electrodes setup.

BACKGROUND

Mobile devices are ubiquitous. The ways to interact with them and the ways mobile devices behave have evolved over time. One important technology for mobile devices is their sensing capabilities. Sensing can occur via many modalities, such as haptic/pressure sensing, audio sensing, light/vision sensing, temperature sensing, and capacitive sensing. Not only can these modalities allow us to interact with the mobile device in a myriad of different ways, these modalities allow the mobile device to become "smarter" such that the mobile devices can better understand contexts and the way users are interacting with the mobile devices.

One interesting modality is capacitive sensing. Capacitive sensing has been used with touch screens for some time to allow user to provide user input via the screen of a mobile device without the use of physical buttons. In some applications, capacitive sensing on a large surface/skin can even be used for sensing grip or hand postures. In some other applications, two electrodes can be provided, one on each side of a mobile device for whole hand recognition. In yet some other applications, an electrode can be provided adjacent to an antenna to detect the presence of a finger or hand in close proximity to the antenna.

OVERVIEW

Conventional user interface for sensing such gestures often require physical touching of a sensor pad, or an area filled with sensor pads. The sensor pads used for these conventional sensor pads take up precious real estate on a compact mobile device, interferes significantly with other components of the mobile device, complicates design, consumes power, and adds costs to the final product. With two or more small capacitive sensing electrodes placed on a mobile device (arbitrarily or with far less restrictions), capacitive sensing can provide a virtual sensor pad as a user interface. By implementing an algorithm which detects for three different conditions, the virtual sensor pad can be used effectively as a user interface modality to detect gestures such as a sliding gesture, drawing gesture, letters, writing, and so on. The resulting virtual sensor pad can flexibly change to different desirable locations, and no longer suffers from the deficiencies of the conventional sensor pad.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Capacitive Sensing and its Applications in Mobile Devices

Capacitive sensing is used in many different types of sensors, including those to detect and measure proximity, position or displacement, humidity, fluid level, and acceleration. Capacitive sensing as a human interface device (HID) technology (for example, providing touch screens to replace the computer mouse) has become more popular. The HID technology can be based on capacitive coupling, which takes human body capacitance as input. Capacitive touch sensors are used in many devices such as laptop trackpads, digital audio players, computer displays/touch screens, mobile phones, mobile devices, tablets, etc. Design engineers continue to choose capacitive sensors for their versatility, reliability and robustness, unique human-device interface, and cost reduction over mechanical switches.

Figure 1:
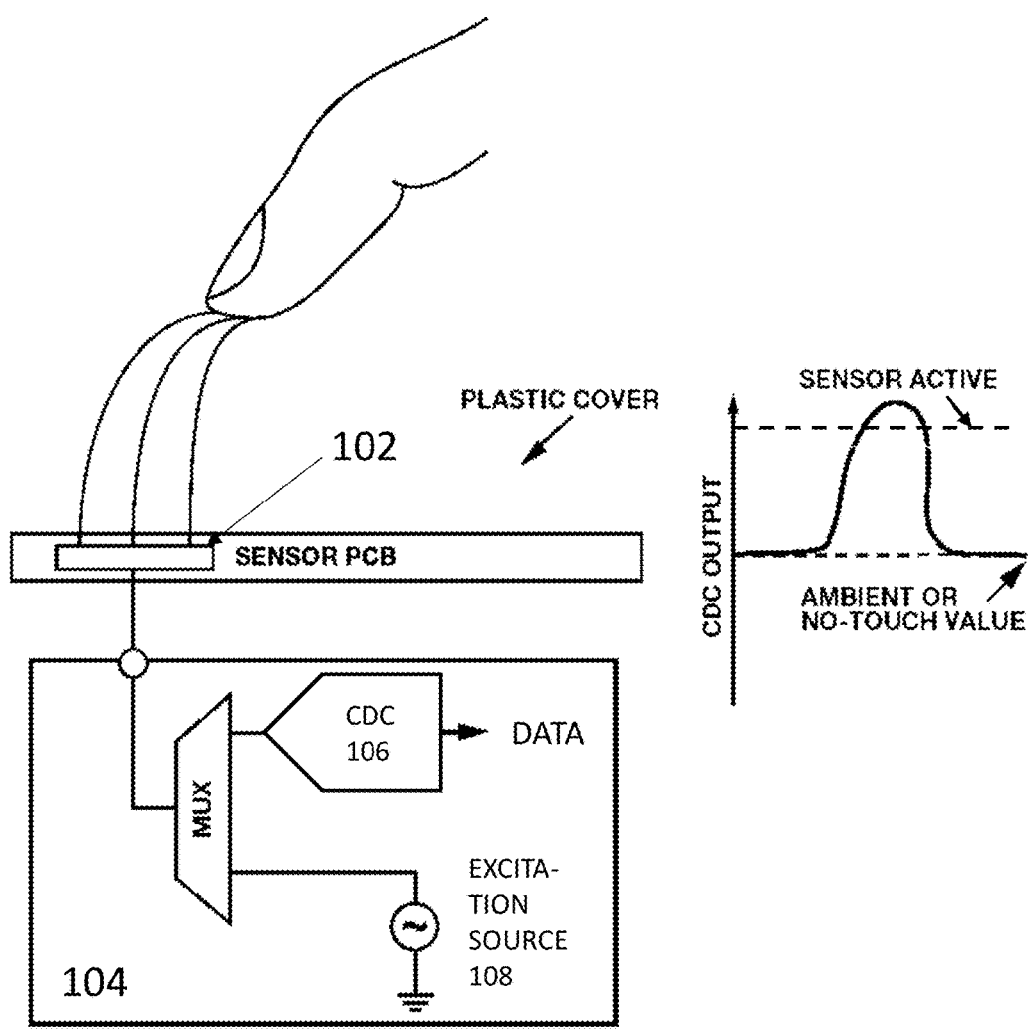
FIG. 1 illustrates a capacitive sensing system having a single capacitive sensing electrode and an exemplary capacitive sensing response generated by the system when a finger approaches the electrode, according to some embodiments of the disclosure.

Capacitive sensors generally detect anything that is conductive or has a dielectric different than that of air, for example, part of a human hand or finger. FIG. 1 illustrates a capacitive sensing system having a single capacitive sensing electrode and an exemplary capacitive sensing response generated by the system when a finger approaches the electrode, according to some embodiments of the disclosure. When an excitation signal charges a capacitive sensor 102 (e.g., an electrode), the capacitive sensor 102 becomes one of the two plates of a virtual capacitor. When an object comes close to the capacitive sensor acting as the second plate of the virtual capacitor, the virtual capacitance based on the charge present on the capacitive sensor can be measured, e.g., by a capacitive sensing controller 104. A capacitive sensing controller 404 is an electronic device which can include an analog front end which is configured to measure the virtual capacitance and convert the analog measurement to digital data using the capacitance to digital converter (CDC) 106. Some capacitive sensing controllers can generate high resolution capacitive measurement data, as high as 16-bits or more for each capacitive sensor. The capacitive sensing controller 104 can also provide an excitation source 108 for providing the excitation signal to the capacitive sensor 102. Typically, the capacitive sensing controller 104 can have a plurality of input pins connectable to a number of capacitive sensors. When the object, e.g., the finger, moves towards the capacitive sensor 102, the capacitive sensor 102 generates a rising response as seen in the response plot showing the output of CDC 106. When the object moves away from the capacitive sensor 102 generates a falling response. In many conventional capacitive sensing applications, the CDC output crossing a "sensor active" threshold would trigger an "on" state, enabling the capacitive sensor 102 to provide an "on or off" function.

Capacitive sensing for mobile devices is particularly useful for sensing a dynamic environment surrounding the mobile device. Electrodes as capacitive sensors can be inexpensive and these electrodes can be extremely compact and thin, which makes capacitive sensing particularly suitable for mobile devices whose form factor can impose constraints on the electronics inside them. For instance, capacitive sensing can obviate the need for mechanical buttons which can often be difficult to provide in a mobile device, whose design constraints continuously drives the devices to be smaller, smoother and/or waterproof.

Mobile devices within the context of this disclosure includes electronic devices which can be held by one or more hands of a user or users (the electronic devices can be completely mobile, and the electronic devices can be tethered to other electronics). Mobile devices can include mobile phones, tablets, laptops, etc. Mobile devices, by virtue of having a small form factor, are usually held by a user's hand or hands during use. With mobile devices, user interface modalities can be restricted in their capabilities, since physical user interfaces are usually are confined to the small form factor of the mobile device. Furthermore, any user interface modality, e.g., voice command recognition, can be limited by the processing power and power budget on these mobile devices. While the present disclosure focuses on examples related to these types of mobile devices having form factors which can be held easily by hands of a user, the sensor arrangements described herein are also applicable to electronic devices in general. For instance, exemplary electronic devices can include steering wheels, gaming console controllers, household appliances, interactive displays, etc. Broadly speaking, it is understood by one skilled in the art that the sensor arrangements disclosed herein can be applied to electronic devices which users are expected to interact with using their hands and/or fingers.

Mechanical Slider

Figure 2:
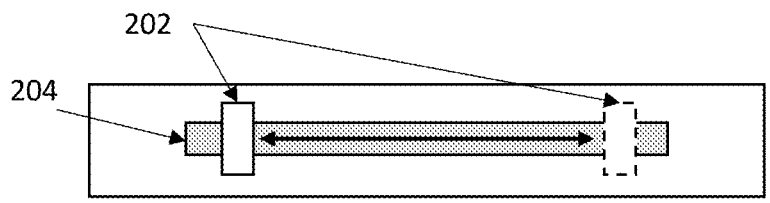
FIG. 2 shows a mechanical slider.

One of many ways a user can interact with a device is through an electromechanical relay, which can translate movement of a mechanical part into an electrical signal. Examples of mechanical relays includes mechanical buttons, mechanical switches, mechanical rollers, mechanical sliders, mechanical joy sticks, etc. FIG. 2 shows a mechanical slider, just as an illustrative example. The mechanical slider comprises a movable mechanical part 202 that a user can use to slide to the left and to the right. The movable mechanical part 202 moves in a track 204, and electromechanical circuits convert the movement and/or position of the movable mechanical part 202 into an electrical signal. Like many other mechanical relays, the mechanical slider are prone to break or wear down easily over a period of use, and cease functioning. Furthermore, mechanical sliders are rarely waterproof. Moreover, mechanical sliders take up precious real estate in electrical devices. The mechanical sliders are fixed and cannot be moved to a different location.

Sensor Pads

In an effort to remove moving mechanical parts, capacitive sensing has been used to replace the electromechanical relay. Typically, a sensor pad having a layout of capacitive sensors are used to sense position of a finger on the sensor pad. The most prevalent ones are touch sensitive pads and touch sensitive screens, which would typically have a grid of capacitive sensors laid out to detect touch and position of a finger on the sensor pad. Other sensor pads have been designed to detect a specific gesture, such a lateral sliding gesture, or a rotary sliding gesture.

Figure 3:
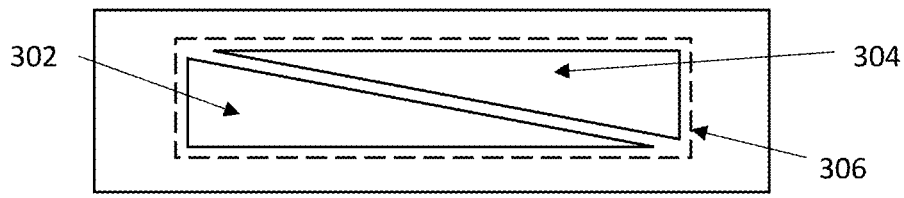
FIG. 3-5 show conventional sensor pads.
Figure 4:
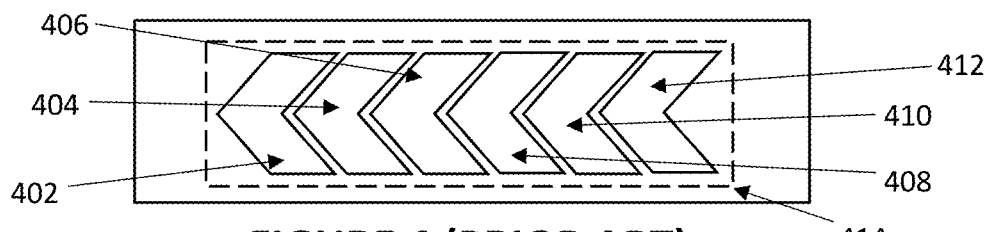

FIGS. 3-4 show conventional sensor pads for detecting a lateral sliding gesture. As seen in FIG. 3, two capacitive sensors 302, 304 having a triangular shape span an area where the lateral sliding gesture is expected (indicated by dotted line area 306). Response generated by the sensors can allow the sensor pad to detect a finger moving from the left to the right (and vice versa) within the span of the two capacitive sensors 302, 304 (indicated by the dotted line area 306). As seen in FIG. 4, a plurality of capacitive sensors 402, 404, 406, 408, 410, 412 are arranged close to each other, side by side in a row to provide a sensor pad. A plurality of sensors 402, 404, 406, 408, 410, 412 span an area where the lateral sliding gesture is expected (indicated by dotted line area 414). Response generated by the sensors can allow the sensor pad to detect a finger moving from the left to the right (and vice versa) within the span of the plurality of capacitive sensors 402, 404, 406, 408, 410, 412 (indicated by the dotted line area 414), and deduce crude position information of the finger as well within the span of the plurality of capacitive sensors 402, 404, 406, 408, 410, 412 (indicated by the dotted line area 414).

Figure 5:
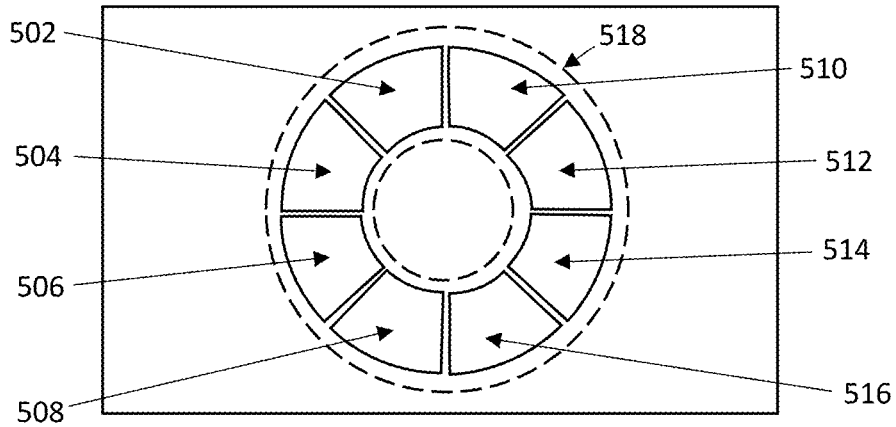

FIG. 5 shows conventional sensor pads for detecting a rotary sliding gesture. As seen in FIG. 5, a plurality of sensors 502, 504, 506, 508, 510, 512, 514, 516 span an area where the rotary sliding gesture is expected (indicated by dotted line area 518). Response generated by the sensors can allow the sensor pad to detect a finger moving in a circular motion within the span of the plurality of sensors 502, 504, 506, 508, 510, 512, 514, 516 (indicated by the dotted line area 518), and deduce crude position information of the finger as well within the span of the plurality of capacitive sensors 502, 504, 506, 508, 510, 512, 514, 516 (indicated by the dotted line area 518).

Capacitive sensor pads illustrated by FIGS. 3-5, while can be made waterproof (e.g., concealed behind an enclosure), the sensor pads take up precious real estate on a device. Furthermore, these sensors pads are restricted to the particular gesture it is designed to sense, and the gesture must be made within the span of the capacitive sensors (i.e., requiring the finger to be placed on top of the capacitive sensors during the duration of the gesture for proper operation). Moreover, the sensor pads are fixed on the device and cannot be moved to a different location.

Improved Capacitive Sensing for Gesture Recognition

Gestures allow users to interact with a device in a natural way, where users can create gestures using an object (e.g., a pen or pointer), hand(s), or finger(s). However, the sensor pads for detecting sliding or other specific gestures illustrated in FIGS. 3-5 are less than ideal. To address some of the problems mentioned herein, and to provide additional technical advantages, an improved approach to capacitive sensing and method for gesture recognition can be implemented, e.g., in mobile devices. Instead of using a physical sensor pad with closely spaced together capacitive sensing electrodes as the user interface, the improved approach to capacitive sensing uses two or more capacitive sensing electrodes which are small and spaced apart. For instance, the electrodes can be 0.25 wide, and spaced 5-10 cm apart from each other. The placement of the electrodes on the mobile device can be arbitrary, or can be placed with far less restrictions due to the electrodes being small, and the method for gesture recognition being flexible to different physical placements of the electrodes.

Figure 6:
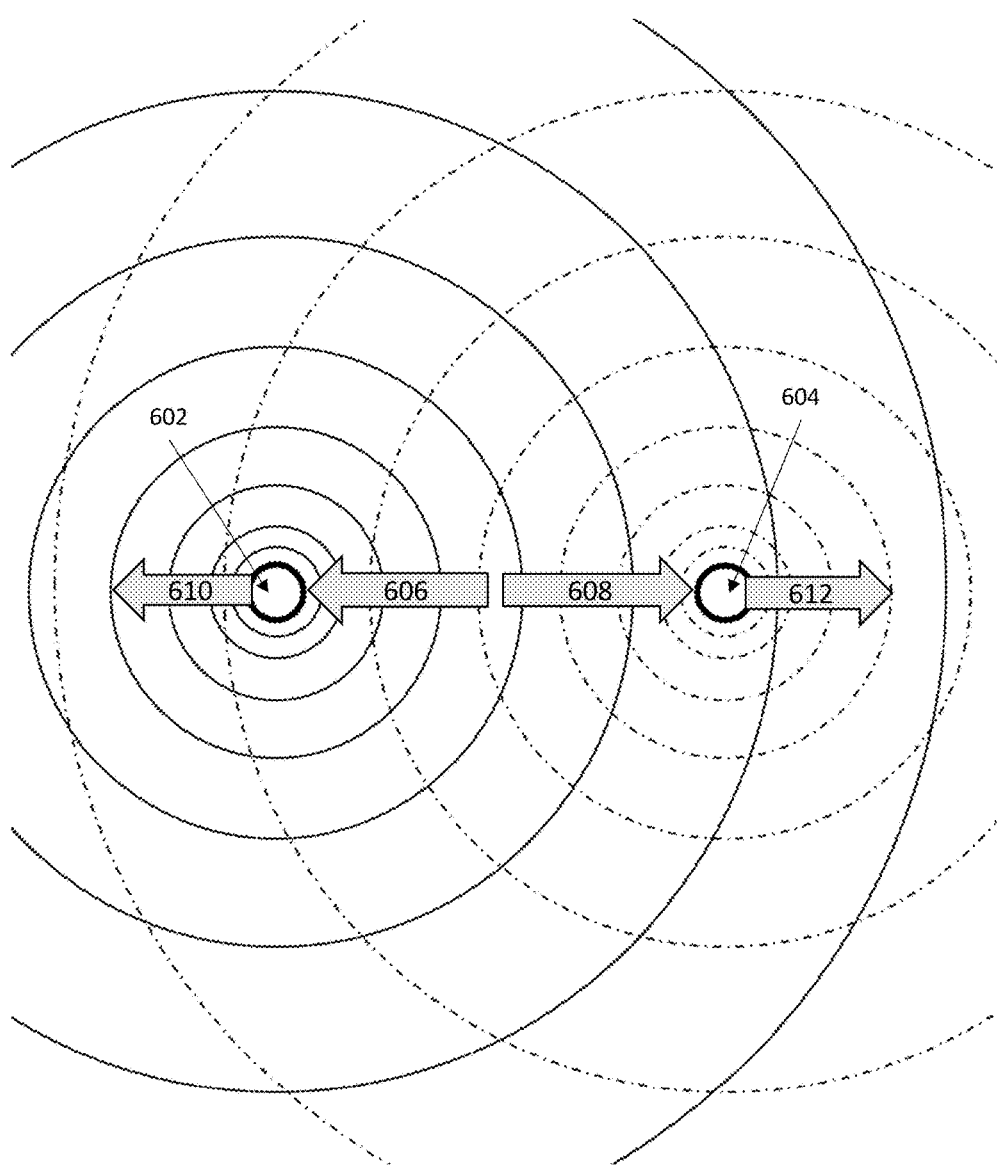
FIG. 6 shows an improved capacitive sensing approach to gesture recognition, according to some embodiments of the disclosure.

FIG. 6 shows an improved capacitive sensing approach to gesture recognition, according to some embodiments of the disclosure. The illustration shows two (left and right) capacitive sensor electrodes 602 and 604, which are small and spaced apart from each other. The solid circular lines represent the electric field equipotential curves with respect to the left electrode 602. The dotted circular lines represent the electric field equipotential curves with respect to the right electrode 604. One important difference of the improved capacitive sensing approach shown is that this approach no longer requires the object (e.g., finger(s), hand) to move on top of closely spaced together capacitive sensing electrodes. In fact, this improved sensing approach leverages the space between the capacitive sensing electrodes and the capacitive sensor measurements generated when the object is not directly on top of the capacitive sensing electrodes to recognize gestures.

In particular, it can be seen that when an object is moving left and right shown by the arrow 606, different characteristic responses (i.e., capacitive sensor measurements) are generated by the left and right capacitive sensing electrodes, which allows a gesture to be recognized:

When the object moves to the left towards the left electrode (illustrated by arrow 606):
  the left electrode 602 would generate a rising response; and
  the right electrode 604 would generate a falling response.
When the object moves to the right towards the right electrode (illustrated by arrow 608):
  the left electrode 602 would generate a falling response; and
  the right electrode 604 would generate a rising response.
When the object moves to the left away from the left electrode and away from the right electrode (illustrated by arrow 610):
  the left electrode 602 would generate a falling response; and
  the right electrode 604 would generate a falling and/or ambient response.
When the object moves to the right away from the right electrode and away from the left electrode (illustrated by arrow 612):
  the left electrode 602 would generate a falling and/or ambient response; and
  the right electrode 604 would generate a falling response.

Based on the above characteristics, two capacitive sensing electrodes can generate capacitive sensor measurements which can be used to detect a sliding gesture, e.g., a finger gesturing from left to right, or from right to left. The capacitive sensor measurements can be checked by one or more classifiers which checks for one or more cases to determine whether a sliding gesture has been made. It can be seen that a lateral sliding gesture from the left to right made over the space between the two capacitive sensing electrodes can be detected with this improved capacitive sensing approach.

Using this improved capacitive sensing approach, the gesture being made no longer has to be within the span of the sensor pad; instead, the gesture can be made within a virtual sensor pad which can be placed at a distance from the two or more capacitive sensing electrodes. The only practical limitation is that the location of the object making the gesture should not be too far away from the electrodes where the electric field is too weak to generate the expected characteristic responses as the gesture is being made. In one example, the virtual sensor pad is placed between the left electrode 602 and right electrode 604. In other examples, the virtual sensor pad can be located in a different place. Accordingly, the improved approach allows the sensor pad to be made virtual, such that it can be relocated or rotated on demand, or changed easily for different requirements. The resulting virtual sensor pad is flexible, and no longer has the physical limitations of a physical sensor pad. Besides, contact on a surface is not required (whereas physical sensor pads would normally require contact), and a user can gesticulate in the air, for example. Moreover, the virtual sensor pad can exist so long the location of the virtual sensor is within "range" of the capacitive sensing electrode (potentially in all directions). This obviates the usual requirement that vision-based gesture systems have, which limits where the gesture has to be made, e.g., within the field of view of a camera. In some applications, the flexibility of the virtual sensor pad can allow the virtual sensor pad to adapt its position and/or orientation to provide better ergonomics and/or convenience of the user. With more capacitive sensing electrodes, complex gestures (e.g., drawing of a character, shape, or other suitable gestures) can also be recognized with this improved capacitive sensing approach.

Capacitive Sensing as a User Interface has a Variety of Use Cases

Figure 7:
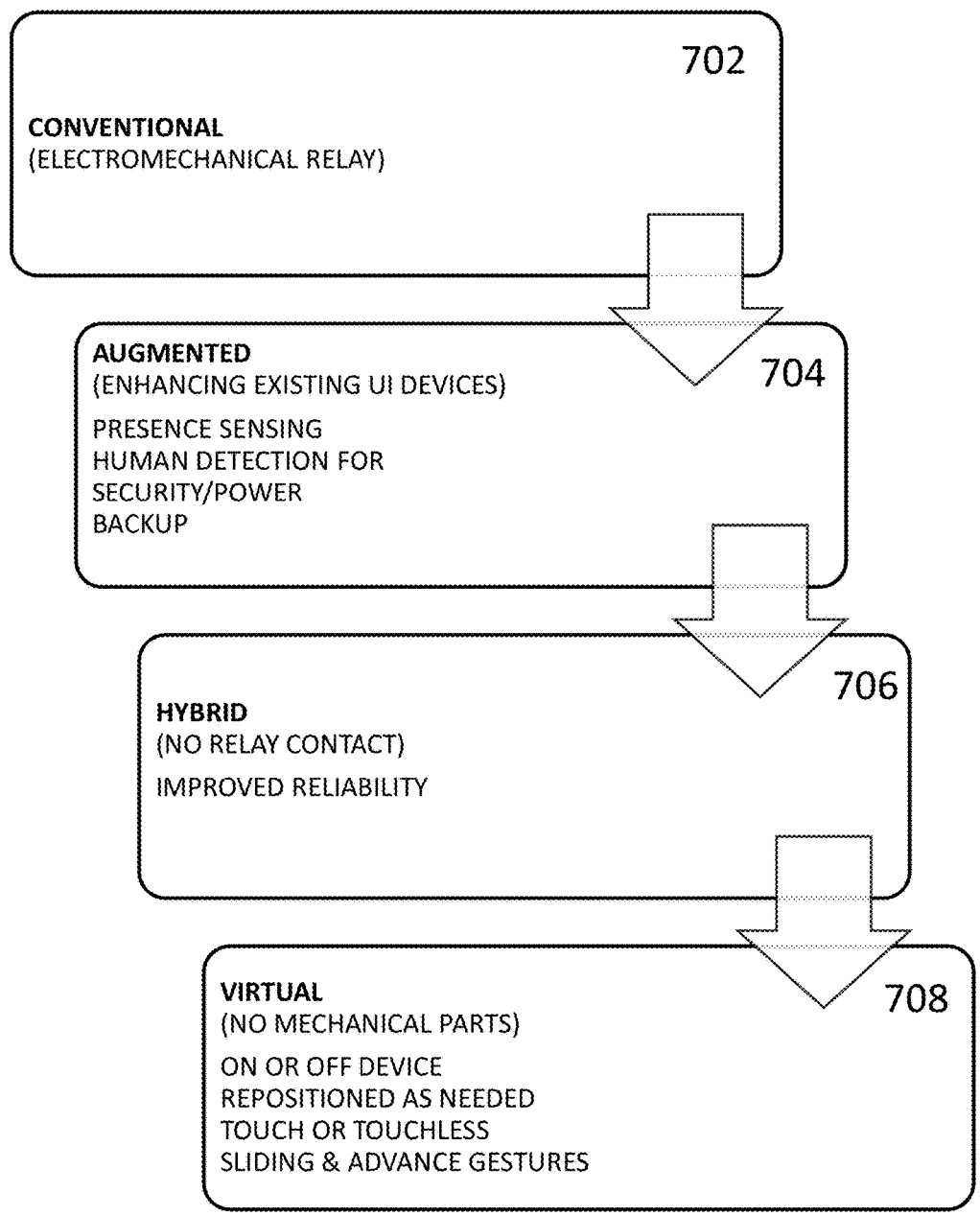
FIG. 7 shows a variety of use cases and functionalities offered by the improved capacitive sensing approach, according to some embodiments of the disclosure.

FIG. 7 shows a variety of use cases and functionalities offered by the improved capacitive sensing approach, according to some embodiments of the disclosure. "CONVENTIONAL" class of user interfaces 702 having electromechanical relays, as illustrated by the mechanical slider in FIG. 2, suffer from many shortcomings, e.g., they are prone to break. Instead of relying on the conventional user interfaces such as the mechanical slider, it is possible to provide classes of user interfaces using the improved capacitive sensing approach.

In one example, capacitive sensing can enhance the conventional electromechanical relay in a class of "AUGMENTED" user interfaces 704. For instance, capacitive sensing can offer presence sensing. For instance, the mechanical slider can turn on, unlock, turn on a lighting element, and/or trigger some other functionality of the mechanical slider when capacitive sensing detects the presence of an object nearby. In some instances, capacitive sensing can offer human detection (i.e., determine whether the object nearby is human or not) to provide security, and/or any of the functionalities mentioned above. Capacitive sensing can also support the conventional mechanical relay by providing virtual sensor pads having a different location from the electromechanical relay. Capacitive sensing can also improve reliability by providing a virtual sensor pad when the electromechanical relay fails.

In another example, capacitive sensing can be used in place of an electromechanical relay in a class of "HYBRID" user interfaces 706, e.g., to improve reliability by providing a virtual sensor pad with capacitive sensing electrodes while offer a mechanical moving part or some form of tactile moving part for the user to use. However, there is no electromechanical relay. A gesture can be detected with just the capacitive sensing electrodes. Reliability is improved since there is no point of failure caused by the electromechanical relay, and capacitive sensing is not prone to wear.

In yet another example, capacitive sensing can replace or avoid the conventional electromechanical relay in a class of "VIRTUAL" user interfaces 708. The improved capacitive sensing approach can provide the virtual sensor pad for gesture recognition (among many other features and advantages). The virtual sensor pad can be provide on the device or off the device; the virtual sensor pad can be repositioned as needed. The virtual sensor pad may be on a surface (touch or contact-based gestures); in some cases, the virtual sensor pad does not require the gesture to be made on a surface (touchless). Depending on the physical configuration of the capacitive sensing electrodes, a wide range of gestures can be recognized from the capacitive sensor measurements. Besides gesture recognition, capacitive sensing can also offer presence detection and/or human detection, for added security, to avoid accidental/unintentional detection of a gesture, etc.

Method for Gesture Recognition

Besides implementing the improved capacitive sensing approach, the solutions described herein implements an effective method for gesture recognition, which leverages the characteristic responses generated by the capacitive sensing electrodes when a gesture is made. The method analyzes the capacitive sensor measurements generated by the capacitive sensor electrodes to detect presence of certain features (e.g., characteristic responses associated with one or more gestures) using three primary classifiers. The three primary classifiers can be used to detect presence of features, and one or more gestures can be recognized based on the outputs of the classifiers (i.e., indicating the presence of one or more features). One or more classifiers can be tuned to detect different features which are characteristic of the gesture to be recognized.

The method offers accurate and efficient gesture recognition. Accuracy and efficiency are particularly important in applications with mobile devices, because the user interface modality should not consume too much power or resources while offer speedy, reactive, and accurate responses when a user makes a gesture. An efficient and clear algorithm also makes it easier to implement, understand, and debug.

Figure 8:
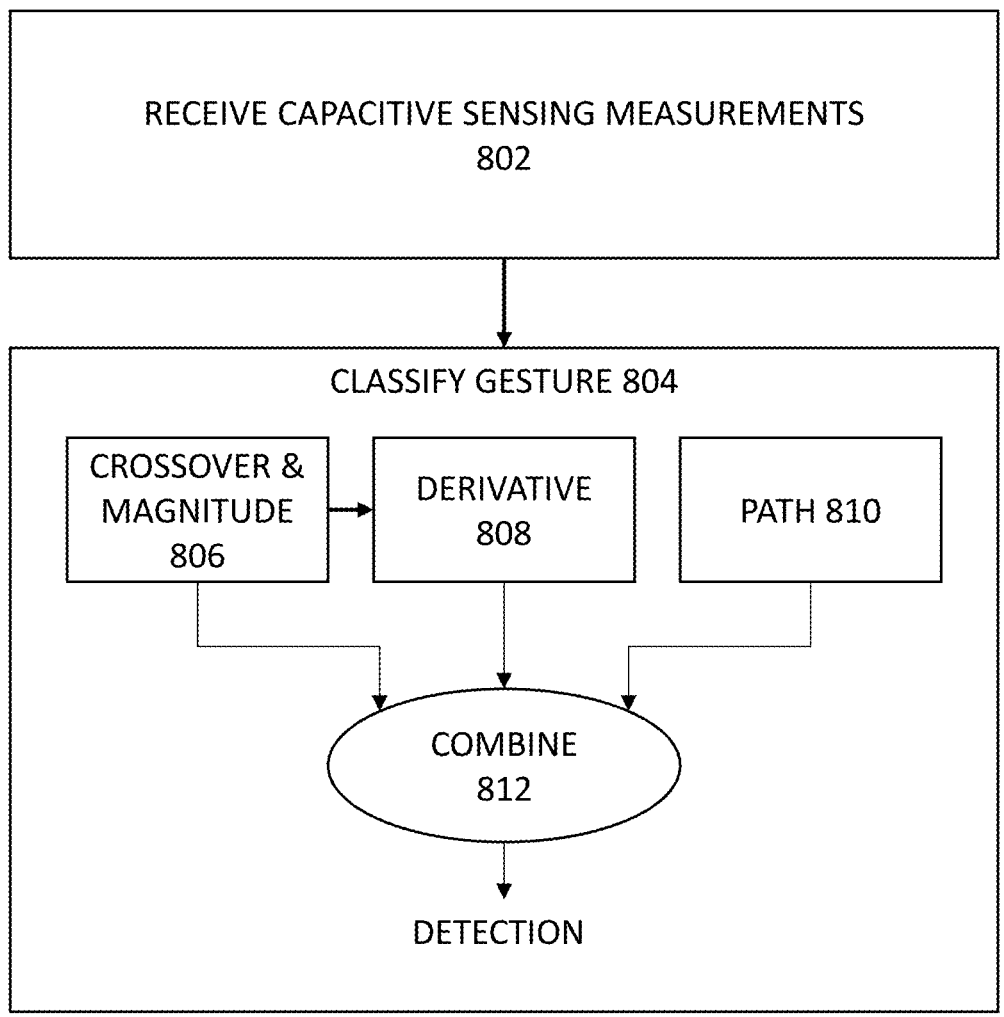
FIG. 8 is a flow diagram illustrating an exemplary method for gesture recognition, according to some embodiments of the disclosure.

FIG. 8 is a flow diagram illustrating an exemplary method for gesture recognition, according to some embodiments of the disclosure. The method for gesture recognition using capacitive sensing comprises receiving, e.g., by a capacitive sensing controller, capacitive sensor measurements made by two or more capacitive sensing electrodes over a period of time (task 802). The two or more capacitive sensing electrodes can be provided as small circular electrodes which are spaced apart, leveraging the teachings illustrated in FIG. 6. Other electrode designs can be used. Generally speaking, the capacitive sensor measurements are representative of disturbances to the respective electric fields generated by the two or more capacitive sensing electrodes. The disturbances, translated into capacitive sensor readings, provide the information from which gestures can be recognized. Note that the disturbances for the same motion or gesture can be different depending on the electric fields being generated by the electrodes. The electric fields can also be different depending on the physical placement and design (e.g., size, shape, material, etc.) of the capacitive sensing electrodes. It is possible to optimize the physical placement and design for a given application (e.g., based on factors such as: gesture(s) to be recognized, physical bounds/restrictions of the device, desired locations/orientations of the virtual sensor pad).

With the capacitive sensor measurements, the method includes classifying a gesture using three classifiers (task 804), crossover/magnitude classifier 806, derivative classifier 808, and path classifier 810. These three classifiers are especially provided to address different corner cases (characteristic responses or features) of a variety of gestures. A correct combination of agreement or disagreement between these classifiers can indicate that a particular gesture has been made.

A first classifier, the crossover/magnitude classifier 806, determines crossover information and magnitude information from the capacitive sensor measurements. Details of the first classifier are described in relation to FIG. 9. A second classifier, the derivative classifier 808, determines derivative information from the capacitive sensor measurements by a second classifier. Details of the first classifier are described in relation to FIG. 14. A third classifier, the path classifier 810, determines path information from the capacitive sensor measurements. Details of the first classifier are described in relation to FIG. 15.

The outputs of the three classifiers can be combined and checked against a dictionary mapping specific outputs to gestures in the combine task 812. Phrased differently, the combine task 812 can classify a gesture based on respective outputs of the first, second, and third classifiers. The method can further include determining, by the combine task 810, whether the outputs of the first, second, and third classifiers matches expected outputs corresponding to the gesture to classify whether the gesture was made by a user. In response to classifying the gesture, the method can further include triggering a user interface action corresponding to the (recognized) gesture.

Together, the three classifiers can provide verification of a gesture, such as a sliding gesture (or swipe). Applying all three different classifiers to check for different features can avoid undesirable corner case behavior (e.g., false positives, false negatives). The three classifiers provides robust gesture recognition. Incorrect gesture recognition can be a great annoyance to users, thus, stability and accuracy of the gesture recognition algorithm are important advantages. Furthermore, one or more of the classifiers can be tuned to different scenarios (gestures, location/orientation of the virtual sensor pad), so that it can adapt under the control of the host. Moreover, the classifiers can calibrate to the current sensor state, and reverts to a default calibration when necessary under host control.

Flexible Location and Orientation

To provide a virtual sensor pad that is easily configurable and adaptable, the method for gesture recognition can further include applying a coordinate transformation to the capacitive sensor measurements, wherein the coordinate transformation corresponds to a particular reference frame of the gesture. The coordinate transformation can be applied to the capacitive sensor measurements before they are passed to the three classifiers. For instance, the method can include changing or setting the coordinate transformation to change or set the reference frame of the gesture with respect to physical locations of the two or more capacitive sensing electrodes.

Consider the capacitive sensor measurements or derivation thereof as a vector of measurements within an initial coordinate system, i.e., an initial reference frame. The particular coordinate system can correspond to a particular location and orientation of the virtual sensor pad for in or on which the gesture is to be made, with respect to the physical configurations of the capacitive sensor electrodes. While the physical configuration of the capacitive sensor electrodes are usually fixed, the virtual sensor pad can be updated to a new location and/or new orientation, i.e., a new coordinate system or a new reference frame. To change the virtual sensor pad to the new location and/or new orientation, the method for gesture recognition can further include determining a matrix which expresses the relationship between the components of the vector in the initial coordinate system and the components of the vector in the new coordinate system. Applying the coordinate transformation can make use of the matrix, and accordingly, applying the coordinate transformation can change or set the reference frame.

Physical Arrangement and Design of Capacitive Sensing Electrodes

As previously explained, it is preferable for the capacitive sensing electrodes to be spaced apart from each other. Furthermore, it is preferable that the capacitive sensing electrodes to be made small, since capacitive sensing with large electrodes (e.g., large relative to the object, such as a large electrode/pad which is larger than a point of a finger, or larger/wider than a hand) can easily saturate when an object is placed on top of the large electrode. Saturated capacitive sensor measurements are not very informative for gesture recognition, since saturation generally means the capacitive sensor measurements are not changing much even when the object is moving. When the capacitive sensing electrodes are small and spaced apart, an area or space (i.e., the virtual sensor pad) can be formed where an object interacting with the electric fields can solicit varying capacitive sensor measurements (i.e., increasing or tapering responses). The varying capacitive sensor measurements are important for providing rich information usable for gesture recognition.

In many embodiments, the capacitive sensing electrodes are provided on a mobile device with which hands would interact. When the mobile device is a handheld device, it is possible that the hand could statically dominate an area of the mobile device. For such devices, it is preferable that the capacitive sensing electrodes are not placed in such area where the hand is expected to be (e.g., an area of a mobile device under a palm when a hand holds the device). Otherwise, the hand statically dominating such an area with a capacitive sensing electrode can easily saturate the electrode, rendering the electrode not very useful for gesture recognition (especially if the other hand is making a gesture). For instance, it is preferred that the capacitive sensing electrodes are placed in areas which users would not normally hold on to for long periods of time, or while users are making gestures.

In some embodiments, the capacitive sensing electrodes can be provided in, on, or under the glass screen of a mobile device, which can, in some cases, include touch screen circuitry. For instance, the electrodes can be placed along the edge of the glass screens (e.g., in some cases, hidden from the user's sight, but not obstructing the display screen). Along with the improved capacitive sensing approach, gestures can be detected without the help from the touch screen circuitry (reducing power otherwise consumed by the touch screen circuitry). The improved capacitive sensing approach and capacitive sensing electrodes can also supplement the functionality of the touch screen circuitry, by assisting finger tracking and/or gesture recognition. In some cases, improved capacitive sensing approach and capacitive sensing electrodes can replace the functionality of the touch screen circuitry if the glass screen breaks or the circuitry malfunctions. A user would still be able to interact with the mobile device. Better yet, when the glass is broken, the capacitive sensing approach and capacitive sensing electrode providing a virtual sensor pad does not require a surface (i.e., the glass screen), which means the virtual sensor pad can operate as a user interface without needing the user to touch broken pieces of glass on the mobile device (offering a safe failure mode).

In some embodiments, the capacitive sensing electrodes can be placed inside chassis of a mobile device (internal enclosure or housing enclosing primary circuitry of a mobile device), outside chassis (e.g., attached to or on chassis), on either or both sides of back cover (usually removable cover), in/on glass screens, near the battery, attachable to a removable circuit (SD card), and so on.

While it is possible to provide a plastic flex circuit to implement the capacitive sensing electrodes and traces to the electrodes, silver paint can also provide the capacitive sensing electrodes and traces. Using silver paint or other conductive paint may be preferable since plastic flex circuits can move over time and/or swell due to humidity and/or temperature. Movement and/or swelling can affect the sensitive capacitive sensor measurements.

The Crossover/Magnitude Classifier

The first classifier, the crossover/magnitude classifier is tailored to track crossover points which are usually located somewhere in between two sensors. Certain motions associated with gestures could trigger positive detection the first classifier. For instance, a sliding gesture moving from one capacitive sensing electrode towards another capacitive sensing electrode would trigger a positive detection for passing over the crossover point in between the two electrodes.

Figure 9:
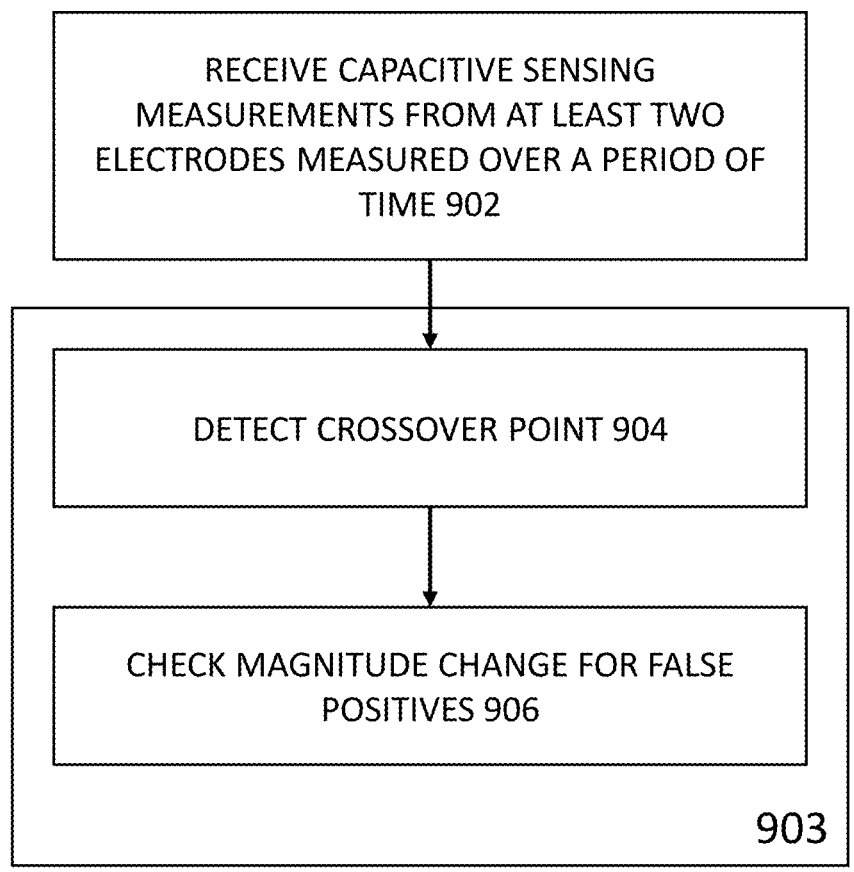
FIG. 9 is a flow diagram illustrating an exemplary method for a first classifier, according to some embodiments of the disclosure.

FIG. 9 is a flow diagram illustrating an exemplary method for a first classifier, according to some embodiments of the disclosure. The method implemented by the first classifier comprises receiving capacitive sensor measurements made by two or more capacitive sensing electrodes over a period of time (task 902, related to task 802 of FIG. 8). Then, the first classifier determines crossover information and magnitude information (task 903), which comprises computing a ratio for a series of points in time and detecting a sign change in the ratio, wherein the sign change indicates a crossover point (task 904). The ratio can be expressed as:

$$r(t) = \frac{a(t) - b(t)}{a(t) + b(t)}$$

Where r(t) is the ratio for a series of points in time t=1, 2, 3, . . . , a(t) represents capacitive sensor measurements from a first capacitive sensing electrode, and b(t) represents capacitive sensor measurements from a second capacitive sensing electrode. A value of the ratio for a given point in time (r(t=T) comprises a ratio between (1) a difference between two capacitive sensor measurements made by two different capacitive sensing electrodes at a given point in time (a(t=T)−b(t=T)) and (2) a sum of the same two capacitive sensor measurements (a(t=T)+b(t=T)). Advantageously, the ratios calculation can provide a robust representation of a moving object such as the finger moving relative to the two capacitive sensing electrodes, detecting whether a finger is moving towards one of the two electrodes. The ratios calculation representation is a smooth surface that behaves nicely when a finger interacts with the electric fields of the electrodes. The ratios calculation also shows what is changing and hides commonality in the capacitive sensor measurements.

Figure 10:
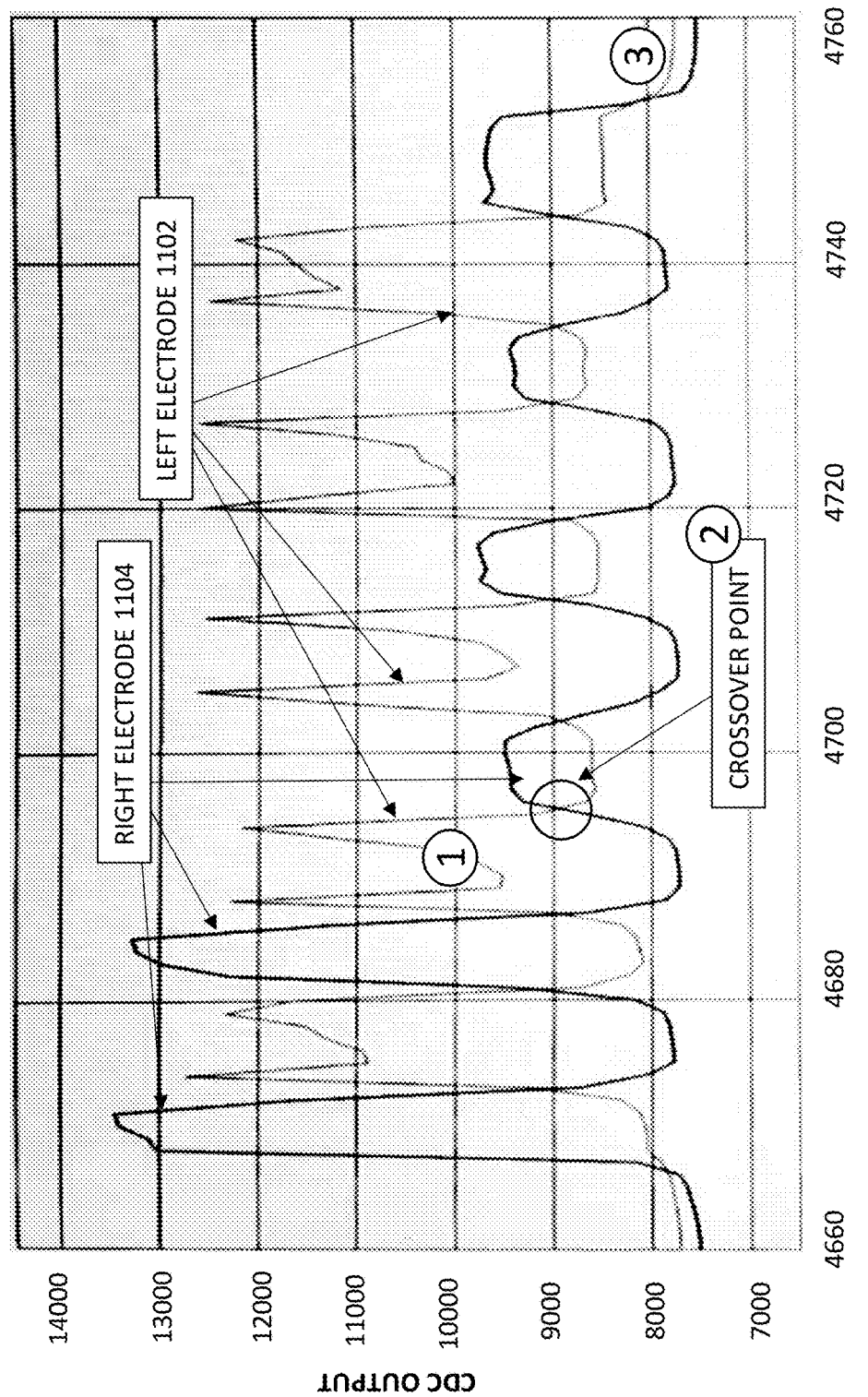
FIGS. 10-13 illustrate operation of the first classifier and second classifier, according to some embodiments of the disclosure.
Figure 11:
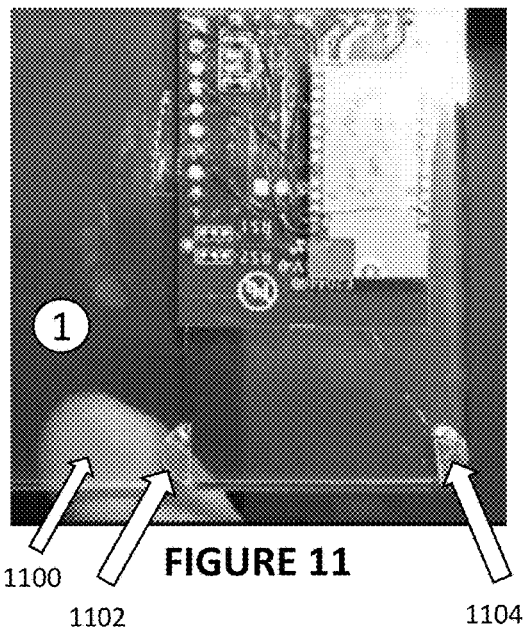
Figure 12:
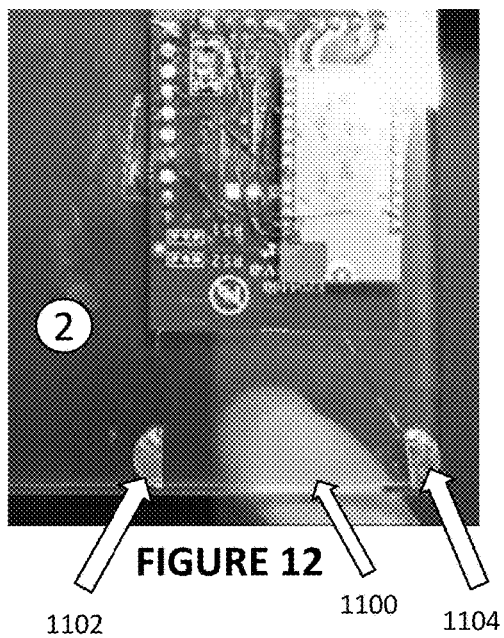
Figure 13:
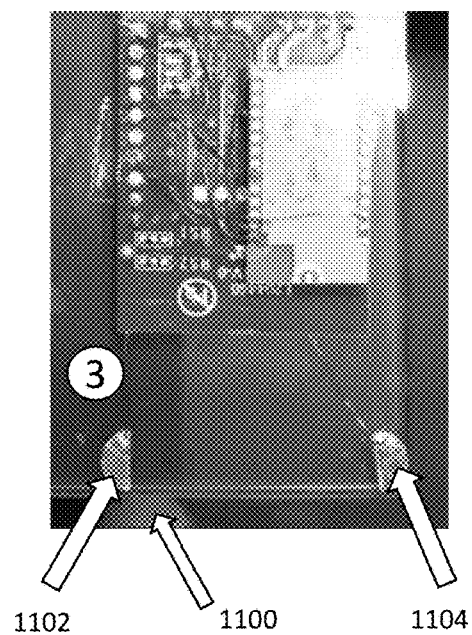

Referring to FIG. 10, which shows a plot of the CDC outputs for two capacitive sensing electrodes as a finger 1100 moves about the two capacitive sensing electrodes: a left capacitive sensing electrode 1102 and a right capacitive sensing electrode 1104 of FIGS. 11-13. The finger 1100 makes lateral sliding gestures (alternating between left and right swipes), and at the end, removing the finger from the virtual sensor pad), and the responses generated by the left capacitive sensing electrode 1102 and right capacitive sensing electrode 1104 are displayed in the plot in FIG. 10.

The point labeled "1" on the plot in FIG. 10 corresponds to the photographic illustration seen in FIG. 11, where the finger is to the left of the left capacitive sensing electrode. The point labeled "2" on the plot in FIG. 10 corresponds to a crossover point, which can be seen in the photographic illustration seen in FIG. 12, where the finger is in between (midpoint) the left and right capacitive sensing electrodes. The point labeled "3" on the plot in FIG. 10 corresponds to the photographic illustration seen in FIG. 13, where the finger is taken off the virtual sensor pad. As the finger moves from left to right and from right to left on the virtual sensor pad, the responses (i.e., the CDC output) generated by the left and right capacitive sensing electrodes take turns rising and falling.

When a finger 1100 crosses a midpoint between the left capacitive sensing electrode 1102 and the right capacitive sensing electrode 1104, the CDC outputs of the left and right capacitive sensing electrodes crosses over each other. This triggers a detection of the crossover point (task 904), which can indicate that a finger is making a lateral motion between two capacitive sensing electrodes, e.g., towards/approaching one of the two capacitive sensing electrodes.

The ratios can be computed for one or more pairs of capacitive sensing electrodes, and the selection of pair(s) of capacitive sensing electrodes for detecting a crossover point in the first classifier can depend on the application.

To increase robustness of crossover detection, the first classifier can buffer (symmetric) number of samples before and/or after the crossover point and check that the a(t) and b(t) values changed magnitude according to a minimum change delta parameter (task 906). In some embodiments, determining crossover information and magnitude information by the first classifier (task 903) further comprises: determining (1) a first amount of magnitude change in capacitive sensor measurements made by a first one of the two different capacitive sensing electrodes over a period before a crossover point and a period after a crossover point, and (2) a second amount of magnitude change in capacitive sensor measurements made by a second one of the two different capacitive sensing electrodes over the same period, and determining whether the first amount of magnitude change and/or the second amount of magnitude change exceeds a minimum delta threshold to qualify as a valid crossover point (corresponding to task 906).

This additional check (task 906) ensures that a positive detection of a crossover point is not caused by a short, weak, wriggly, or unintended gesture, and ensures that deliberate sliding gestures are the ones which triggers the crossover detection.

Furthermore, the additional check (task 906) can further include examining the capacitive sensor readings in the buffers to determine the direction of the sliding gesture. For instance, the buffer holding the capacitive sensor measurements a(t) and b(t) made during the period after a crossover point or the direction of sign change of the ratios (e.g., from positive to negative, or from negative to positive) can be examined to determine whether the finger is moving towards the right electrode (expecting a rising response) and away from the left electrode (expecting a falling response), or vice versa.

The Derivative Classifier

The second classifier, the derivative classifier, examines the derivatives of the a(t) and b(t) buffers at a specified point in time before and/or after the crossover point detection, and an average magnitude of derivative is calculated. If the sign and magnitude of the derivative of two or more buffers agree, then the second classifier outputs a positive detection. This provides a robust classifier which can reject gestures which are made too slowly, gestures which were made unintentionally, or noise.

Figure 14:
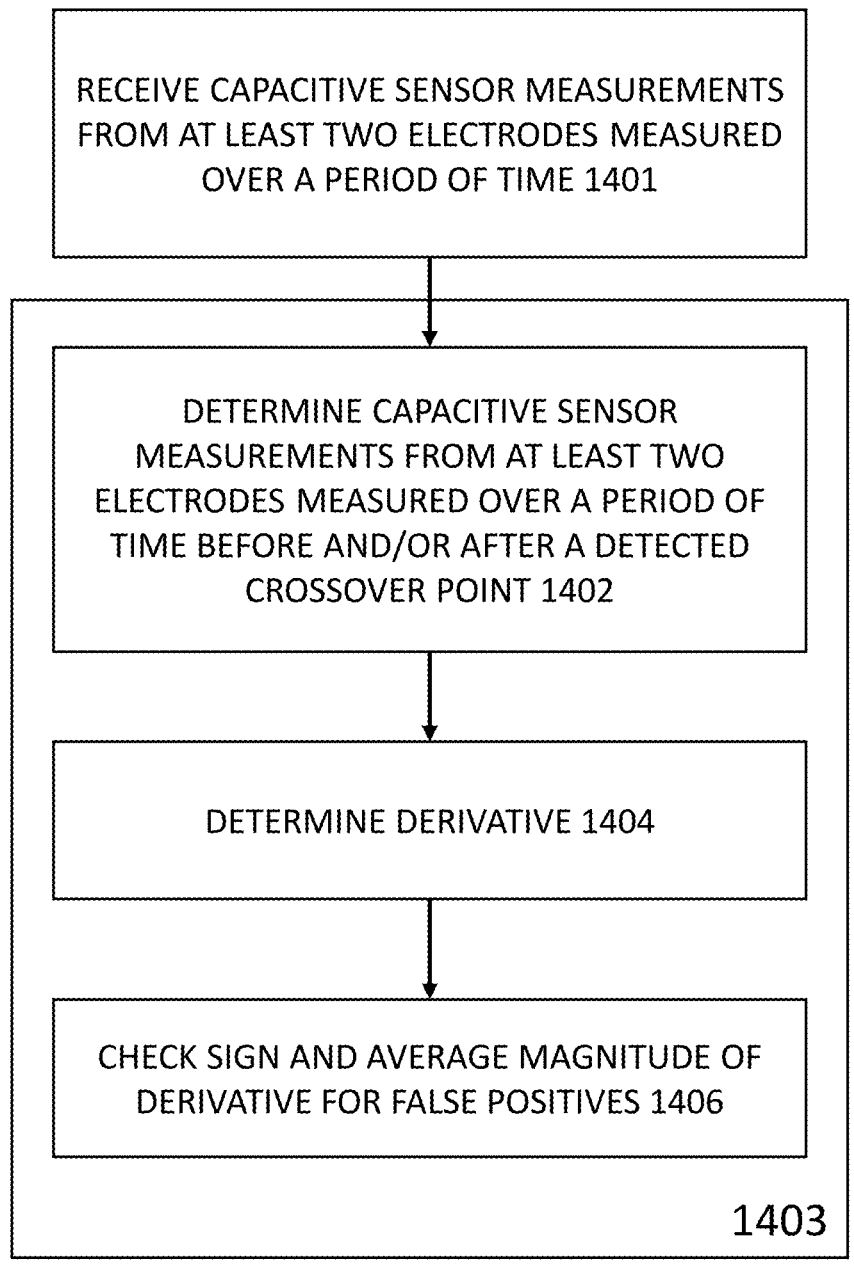
FIG. 14 is a flow diagram illustrating an exemplary method for a second classifier, according to some embodiments of the disclosure.

FIG. 14 is a flow diagram illustrating an exemplary method for a second classifier, according to some embodiments of the disclosure. The method implemented by the second classifier comprises receiving capacitive sensor measurements made by two or more capacitive sensing electrodes over a period of time (task 1401, related to task 802 of FIG. 8). The method further includes determining derivative information by the second classifier (task 1403), which includes determining first capacitive sensor measurements from a first one of two different capacitive sensing electrodes measured over a period before and/or after a detected crossover point, and determining second capacitive sensor measurements from a second one of two different capacitive sensing electrodes measured over the same period (task 1402). This task allows the buffers of the capacitive sensing measurements before and/or after the crossover point to be examined.

Determining derivative information (task 1403) further includes determining derivatives of the first capacitive sensor measurements and derivatives of the second capacitive sensor measurements (task 1404). The derivatives provide an indication of how quickly the finger is moving, so that the classifier only outputs positive detection when there is sufficient amount of change in the capacitive sensor measurements, i.e., sufficient amount of movement by the finger.

In some cases, determining derivative information (task 1403) further includes determining whether a first average of the derivatives of the first capacitive sensor measurements and/or a second average of the derivatives of the second capacitive sensor measurements exceeds a minimum magnitude threshold (task 1406). This task checks whether the average change in sufficiently high enough for a positive detection.

In some cases, determining derivative information (task 1403) further includes determining whether sign of the derivatives of the first capacitive sensor measurements and sign of the derivatives of the second capacitive sensor measurements are opposites of each other (task 1406). This task checks to make sure the directions of the change in capacitive sensor measurements are correct or congruent. For instance, when the finger is moving towards a left capacitive sensing electrode and away from a right capacitive sensing electrode, the second classifier may expect positive derivatives for the CDC output from the left capacitive sensing electrode and negative derivatives for the CDC output from the left capacitive sensing electrode.

Derivatives of the CDC outputs can be estimated by finding the difference between samples in the CDC output. Other equivalent numerical methods for detecting sufficient and correct amount of change in the capacitive sensing measurements can be applied, besides the embodiments described.

The Path Classifier

The third classifier, the path classifier, leverages path information to determine whether an expected gesture has been made. The third classifier can determine use path information between initial and end contact points of the path to recognize slide gestures. For a given gesture, there is an expectation of travel length and path, and using that expectation, it is possible to check the actual capacitive sensor measurements against the expectation. If the actual capacitive sensor measurements matches against the expectation, the third classifier outputs a positive detection. The expectations, or the model of the gesture, can differ depending on the gesture, so the third classifier is preferably tuned to the gesture of interest.

Figure 15:
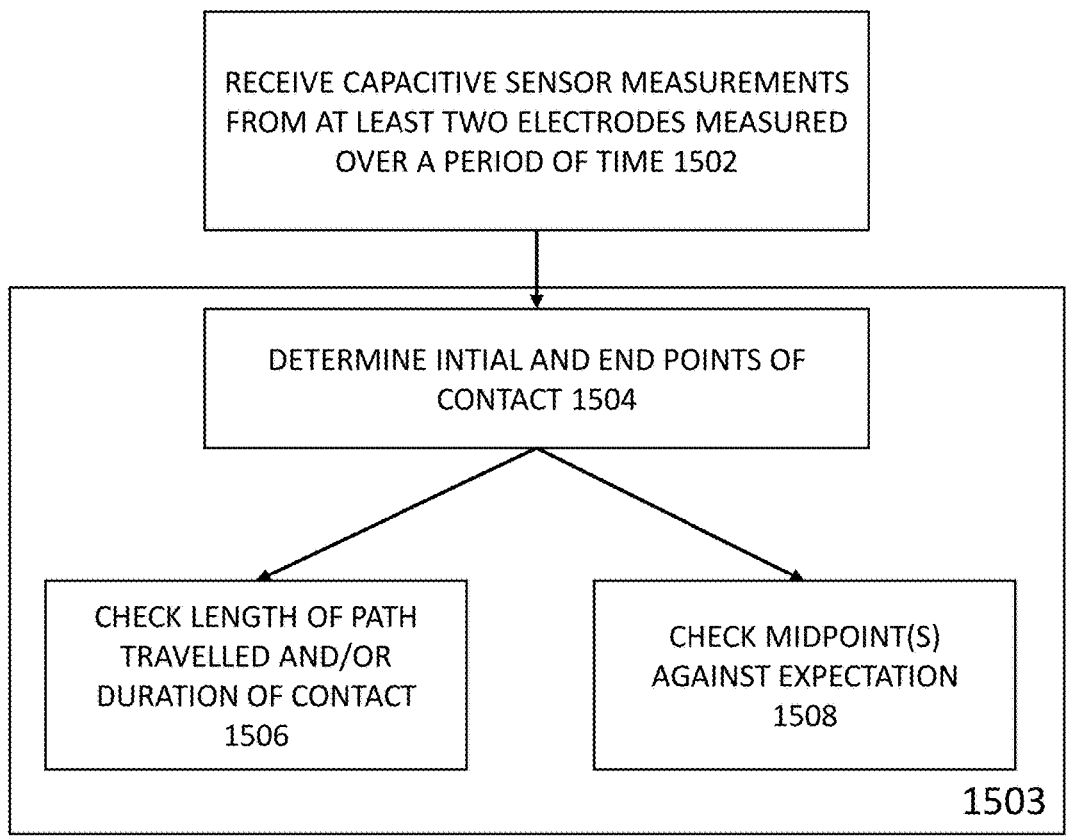
FIG. 15 is a flow diagram illustrating an exemplary method for a third classifier, according to some embodiments of the disclosure.

FIG. 15 is a flow diagram illustrating an exemplary method for a third classifier, according to some embodiments of the disclosure. The method implemented by the third classifier comprises receiving capacitive sensor measurements made by two or more capacitive sensing electrodes over a period of time (task 1502, related to task 802 of FIG. 8). The method further includes determining path information (task 1503).

In some embodiments, determining path information by a third classifier (task 1503) can include determining initial and end points of the gesture based on the capacitive sensor measurements from the two or more capacitive sensing electrodes (task 1504). Determining path information by a third classifier (task 1503) can further include determining estimated length of path traveled based on the initial and end points and comparing the estimated length of path traveled against an expected length of path traveled corresponding to the gesture (task 1506).

In some embodiments, determining path information by a third classifier (task 1503) can include determining initial and end points of the gesture based on the capacitive sensor measurements from the two or more capacitive sensing electrodes (task 1504). Determining path information by a third classifier (task 1503) can further include determining midpoint information along the path between the initial and end points of the gesture and comparing the midpoint information against an expected range corresponding to a predetermined midpoint of the gesture (task 1508).

In some embodiments, the initial and end points of the gesture can be determined by finding dwell points where the finger has paused or has substantially no movement for a short period of time. Naturally, the finger pauses before and after making a gesture, so the dwell points are good indication of initial and end points of a gesture.

Based on the initial and end points, it is possible to determine an expected length of path traveled for a particular gesture. For instance, a lateral swipe between two points would have an expected length corresponding to the distance between the two points. In another instance, the drawing of the letter "S" starting from one point and ending at another point would have an expected length that corresponds to roughly 3x the distance between the two points. The actual or estimated length of the path traveled can be derived from the capacitive sensing measurements using a line integral, for example.

Figure 16:
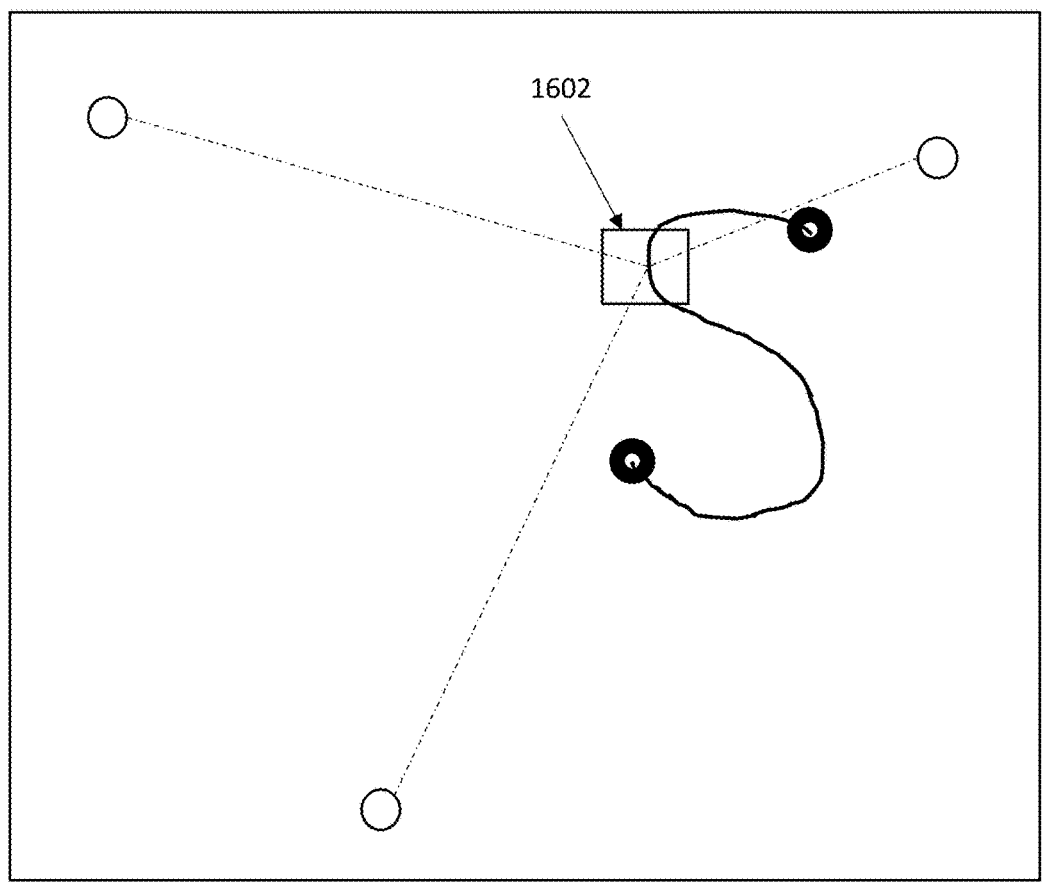
FIG. 16 illustrates operation of the third classifier, according to some embodiments of the disclosure.

Based on the initial and end points, it is also possible to determine regions where a midpoint is expected. FIG. 16 illustrates operation of the third classifier, according to some embodiments of the disclosure. In this example, three capacitive sensing electrodes are used (shown as circles). Suppose the gesture to be detected is the drawing of the letter "S", and at roughly one-third of the path traveled, the model of the gesture would expect capacitive sensing measurements which would indicate the finger is within the expected range 1602 (e.g., region, area, or volume). Accordingly, the third classifier can determine some midpoint information along the path (e.g., midpoints at roughly one-third of the path traveled), and check whether the midpoint information along the path is within the expected range 1602. Several midpoints along different extents of the path can be checked for increase robustness.

Since capacitive sensing measurements do not indicate position of the finger directly, it is possible to translate the capacitive sensing measurements into position information (e.g., by triangulating the finger position using capacitive sensing measurements from three or more capacitive sensors) if the model of the gesture is embodied as position information. It is possible to define the model of the gesture in terms of capacitive sensing measurements, and thus obviating the need to translate the capacitive sensing measurements into position information.

Illustrative Setups

Figure 17A:
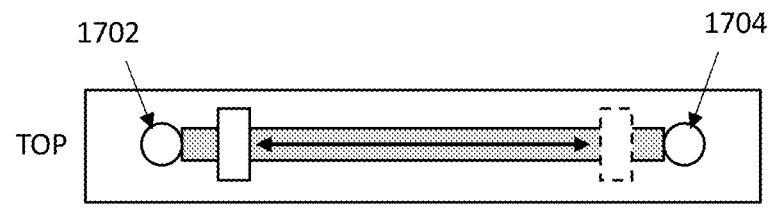
FIGS. 17A-B, and 18 illustrate a possible application of the capacitive sensing approach and method for gesture recognition, according to some embodiments of the disclosure.
Figure 17B:
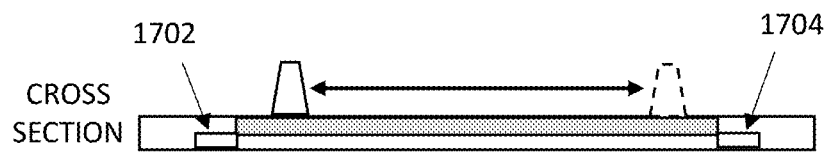
Figure 18:
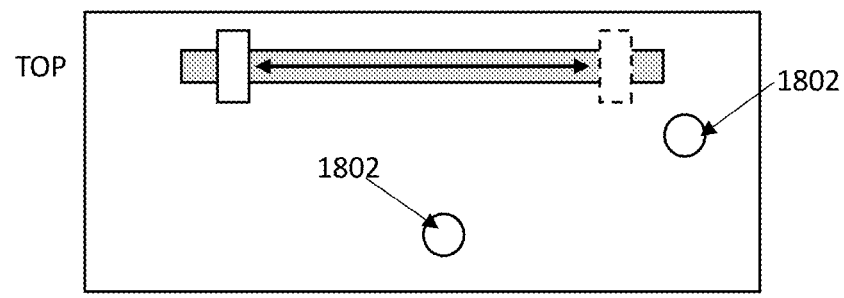
Figure 19:
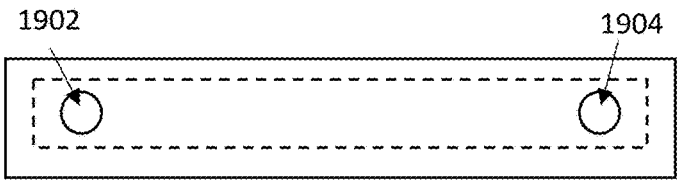
FIGS. 19-27 illustrate exemplary virtual sensor pads, according to some embodiments of the disclosure.
Figure 20:
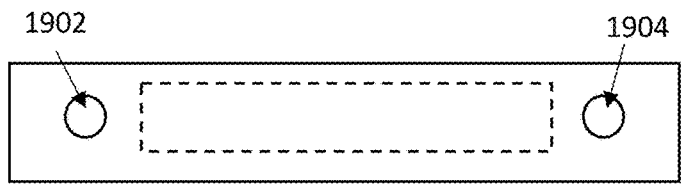
Figure 21:
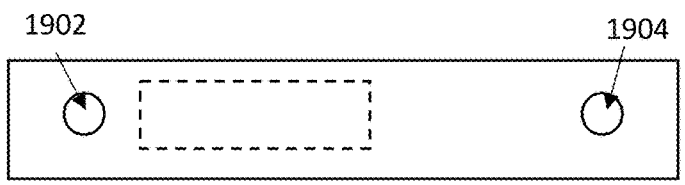
Figure 22:
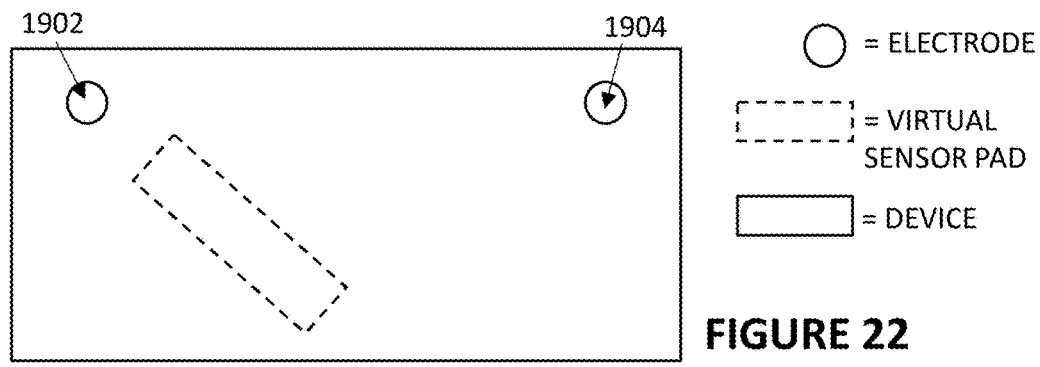

FIGS. 17A-B, and 18 illustrate a possible application of the capacitive sensing approach and method for gesture recognition, according to some embodiments of the disclosure. In these examples, two or more capacitive sensors (shown as capacitive sensing electrodes 1702 and 1704) can supplement functionality of the mechanical slider or replace functionality of the mechanical slider if the mechanical slider fails. In FIGS. 17A-B, the capacitive sensing electrodes 1702 and 1704 can be placed on opposite ends of the mechanical slider. In FIG. 18, the capacitive sensing electrodes 1802 and 1804 can be placed in different locations (thus changing the reference frame), but still can detect a sliding gesture made on the mechanical slider. These examples fall under the "AUGMENTED" class 704 of FIG. 7.

Figure 23:
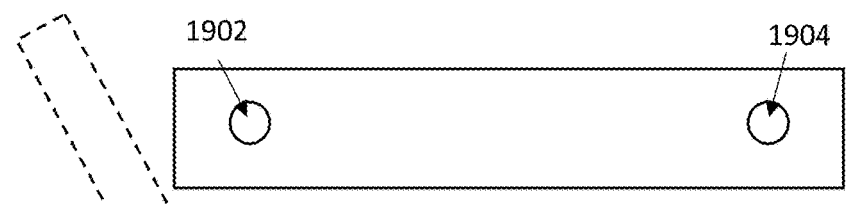
Figure 24:
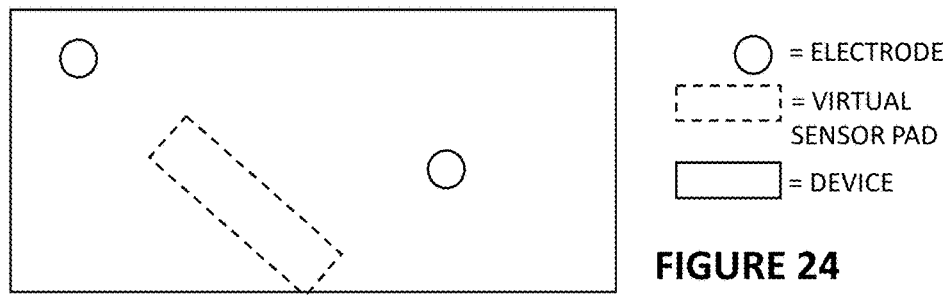
Figure 25:
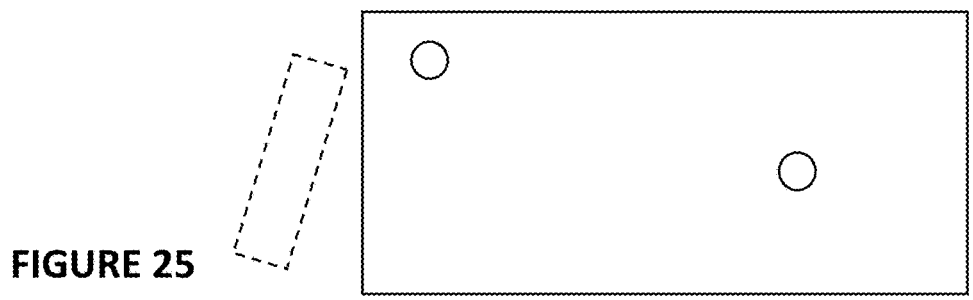
Figure 26:
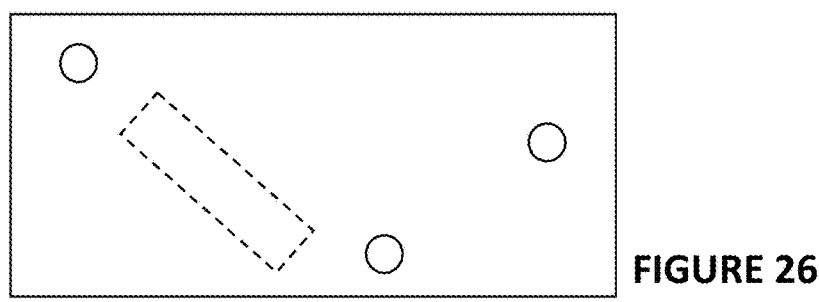
Figure 27:
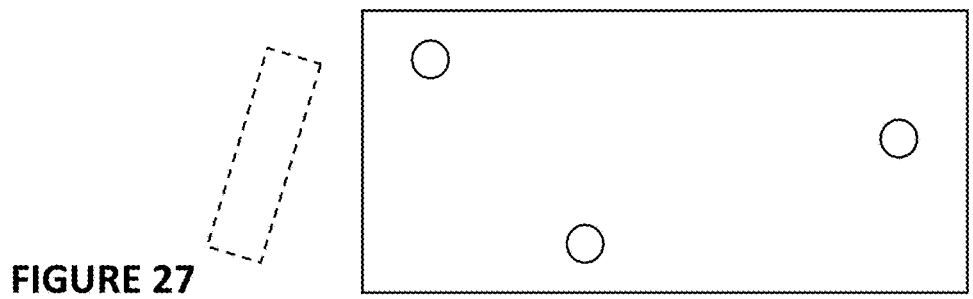

FIGS. 19-27 illustrate exemplary virtual sensor pads, according to some embodiments of the disclosure. These examples can fall under the "HYBRID" class 706 or "VIRTUAL" class 708 of user interfaces (if the virtual sensor pad is off or away from the device, then the example falls under the "VIRTUAL" class 708). It can be seen from the examples that with the same two capacitive sensing electrodes 1902 and 1904, a variety of virtual sensor pads (shown as the exemplary dotted line rectangle) can be provided. The virtual sensor pads can differ in size, location/position, and orientation. In FIG. 23, it can be seen that the virtual sensor pad can be even provided off or away from the device (the device or surface being indicated by the solid line rectangle). It can also be seen from FIGS. 24-27, that different number of capacitive sensing electrodes can be used to provide the variety of virtual sensor pads, and the capacitive sensing electrodes can have different positions/designs.

Figure 28:
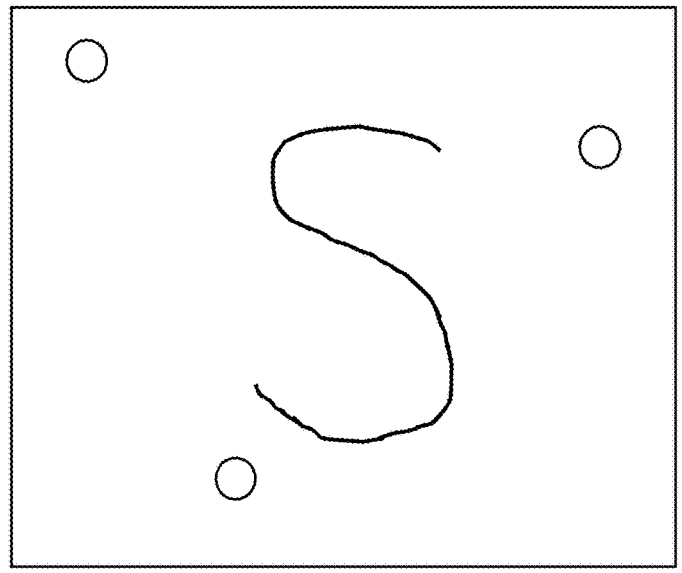
FIGS. 28-29 illustrate exemplary gestures, according to some embodiments of the disclosure.
Figure 29:
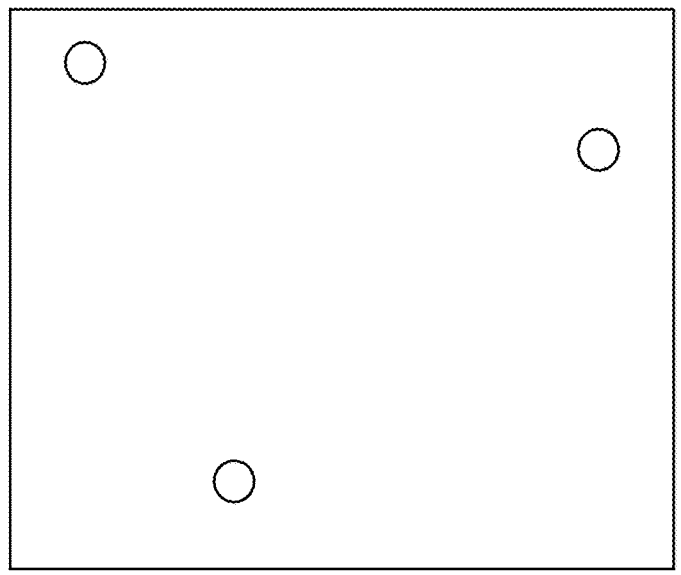

FIGS. 28-29 illustrate exemplary gestures, according to some embodiments of the disclosure. It can be seen that the exemplary gesture, the drawing of the letter "S", can be recognized using the method described herein. The gesture can be made on the device (FIG. 28), or off the device (FIG. 29).

Figure 30:
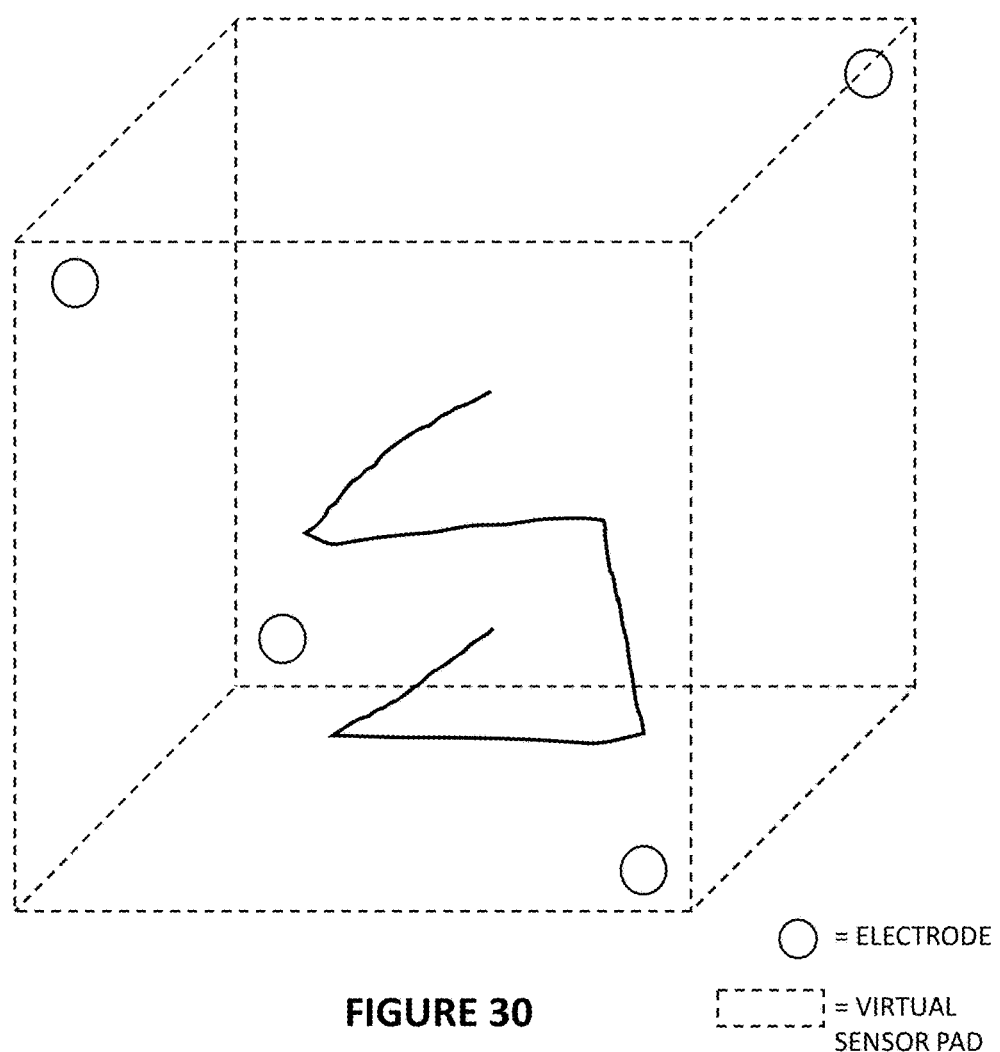
FIG. 30 illustrates an exemplary application of the capacitive sensing approach and method for gesture recognition, according to some embodiments of the disclosure.

While the present disclosure describes gestures made on a two-dimensional plane, the improved capacitive sensing approach and method described herein can also detect three-dimensional gestures made within a virtual sensor pad (in this case, a virtual sensor volume). FIG. 30 illustrates an exemplary application of the capacitive sensing approach and method for gesture recognition, according to some embodiments of the disclosure. In this example, four capacitive sensing electrodes distributed in a three-dimensional volume can detect a three-dimensional gesture made within the virtual sensor pad. While not shown as separate figures, it is envisioned by the disclosure that the virtual sensor pad can be located in a different location, have a different size, and/or have different orientation, than the example illustrated in FIG. 30. It is noted that this is very difficult to achieve with vision based gesture recognition mechanisms where depth perception is hard to provide. In contrast, capacitive sensing can advantageously and readily provide gesture recognition in a three-dimensional volume.

Capacitive Sensing System

Figure 31:
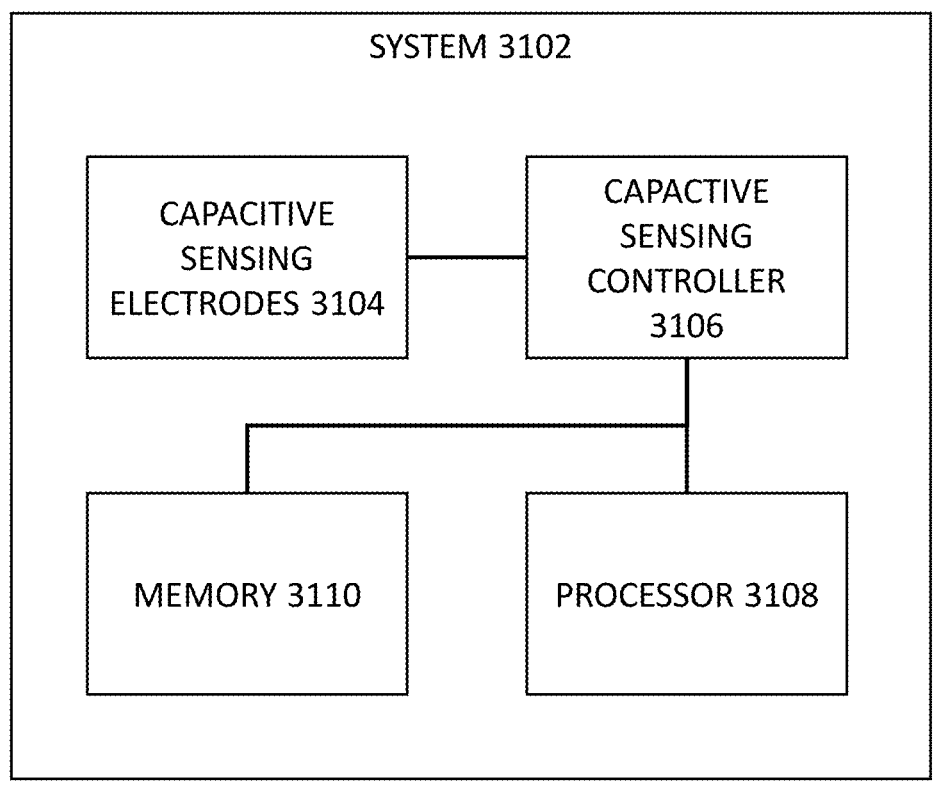
FIG. 31 illustrates an exemplary capacitive sensing system for gesture recognition, according to some embodiments of the disclosure.

FIG. 31 illustrates an exemplary capacitive sensing system for gesture recognition, according to some embodiments of the disclosure. The capacitive sensing system 1302 comprises two or more capacitive sensing electrodes 3104, a capacitive sensing controller 3106, one or more non-transitory computer-readable memory 3110, and one or more processors 3108. The capacitive sensing electrodes 3104 are electrically coupled (e.g., via signal traces) to a capacitive sensing controller 3106 (similar to controller 104 of FIG. 1), which is configured output capacitive sensing measurements. The capacitive sensing measurements can be stored in memory 3110. In some instances, the processor 3108 may be configured to carrying out the method for gesture recognition described herein by executing one or more instructions stored on a non-transitory computer medium such as memory 3110. In alternative embodiments, the processor 3108 can be a dedicated processor having circuitry specifically designed for gesture recognition. In some embodiments, the processor 3108 can include both processing circuitry which can execute instructions stored in memory 3110, and circuitry specifically designed for gesture recognition. The specialized circuitry, can include circuitry which can implement any one or more of the classifiers, for example, or the processes within the one or more classifiers (e.g., computing ratios, derivatives, etc.) In some embodiments, the processor 3108 may include one or more application specific components, or may include programmable logic gates which are configured to carry out the functions describe herein. The circuitry can operate in analog domain, digital domain, or in a mixed signal domain.

Virtual Slider as an Example

As described extensively above, the improved capacitive sensing approach and method for gesture recognition can provide a virtual slider. The gesture being recognized comprises a sliding motion forming a line from a first point to a second point. The sliding motion can be used to provide a "swipe" to scroll/dig/flip though icons images or a document on a mobile device, to unlock a device, to check off items, change angle of view through virtual space, etc. The virtual slider pad can distinguish different directions of the sliding motion, or recognize sliding motions having different directions. The present disclosure is not limited to recognizing slides (or swipes), but other gestures as well.

Providing Rich Information about the Gesture

Besides outputting a final output indicating gesture recognition, the method described herein can also report single finger position, type of gesture recognized, initial (contact) point, end (contact) point, direction of gesture, gesture length, individual outputs from the classifiers, path information of the gesture, environmental change of slider characteristics, speed of gesture, confidence level of gesture recognition, etc.

Exemplary Gesture Recognition Platform

A platform (or pipeline) can be implemented to the capacitive sensing system to allow a variety of gestures to be recognized. The platform allows a variety of gestures to be recognized based on sets of parametric constraints and rules corresponding to different gestures. The sets of parametric constraints and rules can be specified by the user interface designer. The platform can be modified dynamically to detect different gestures since the parametric constraints and rules can be dynamically updated as needed or desired. Multiple sets can be joined by a further rule to detect multiple gestures in a sequence.

Feature extraction can apply a transform to incoming sensor data or process incoming sensor data to extract one or more features. Feature extraction applies a transform to incoming sensor data to reveal a particular aspect of the behavior of the data. Some examples are the comparison of directions and magnitudes of vectors of sample data, vectors of derivative data, instantaneous magnitudes, ratios of instantaneous magnitudes, or any other transform which presents insight into the behavior of the user, behavior of the device, and/or behavior of the environment. Feature extraction can simultaneously be used to track ambient, mechanical, or any other parasitic changes which effect sensor output. Feature extraction can include determining crossover information, magnitude information, derivative information, and path information.

The platform can apply parametric constraints and/or rules to the features to enable classification, i.e., gestures to be recognized from the data. The parametric constraints and rules can serve as a dictionary which maps specific outputs to gestures. Parametric constraints can be applied to features extraction and/or features selection. For instance, the parametric constraints can affect one or more of the following: how the features are extracted and which features to extract. Rules can be applied to features for classification, including checking whether certain feature(s) are present, or whether certain feature(s) meet a particular criteria. In some embodiments, rules can be parameterized so that the criteria to be met by the features can vary or change to classify different gestures.

For a slider gesture, illustrative parametric constraints may include one or more of the following: centroid information (defining a center of the slider or a predefined region), active radius information (defining length of the slider or a range of lengths of the slider), angle information (governing the slider's rotation or range of rotation), initial touch information (can be any given initial touch point or a predefined region), final touch information (can be any given final touch point or a predefined region), and velocity information (can be any given velocity or a predefined velocity, or a predefined range of velocities). Illustrative rules may require one or more of the following features to be present, or to meet a certain criteria: point, initial touch, final touch, and velocity. Generally speaking, these features specified by the rules can fall under one or more of the following: crossover information, magnitude information, derivative information, and path information.

Variations and Implementations

Note that the activities discussed above with reference to the FIGURES are applicable to any integrated circuits that involve gesture recognition using capacitive sensing. The improved capacitive sensing approach and method can be applicable to any electrical device where a gesture recognition user interface is desirable. These electrical devices can be found in many different contexts, for instance, consumer electronics (mobile devices, appliances, gaming systems, computers, augmented reality, virtual reality), medical systems, scientific instrumentation, industrial systems, aerospace systems, automotive systems, security systems, etc.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the gesture recognition functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to gesture recognition, illustrate only some of the possible functions that may be executed by, or within, systems illustrated in the FIGURES, such as FIG. 31. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

What is claimed is:

1. A method for gesture recognition using capacitive sensing, the method comprising:
receiving capacitive sensor measurements made by two or more capacitive sensing electrodes over a period of time, said capacitive sensor measurements representative of disturbances to the respective electric fields generated by the two or more capacitive sensing electrodes;

determining, by a first classifier, crossover information and magnitude information from the capacitive sensor measurements;

determining, by a second classifier, derivative information from the capacitive sensor measurements;

determining, by a third classifier, path information from the capacitive sensor measurements; and classifying a gesture based on respective outputs of the first, second, and third classifiers;

wherein classifying a gesture based on outputs of classifiers further comprises:

detecting a sign change of a difference between a first capacitive sensing electrode measurement and a second capacitive sensing electrode measurement, wherein the sign change indicates a crossover point positioned between the first capacitive sensing electrode and a second capacitive sensing electrode;

determining whether a detected crossover point is valid by determining whether a magnitude change in capacitive sensor measurement made by at least one of the first and the second capacitive sensing electrode over a period of time before and/or after the crossover point exceeds a minimum delta threshold.

2. The method of claim 1, wherein the gesture comprises a sliding motion forming a line from a first point to a second point.

3. The method of claim 1, further comprising:
applying a coordinate transformation to the capacitive sensor measurements, wherein the coordinate transformation corresponds to a particular reference frame of the gesture.

4. The method of claim 3, further comprising:
changing or setting the coordinate transformation to change or set the reference frame of the gesture with respect to physical locations of the two or more capacitive sensing electrodes.

5. The method of claim 1, wherein determining crossover information and magnitude information by the first classifier comprises:
computing a ratio for a series of points in time, wherein a value of the ratio for a given point in time comprises a ratio between (1) a difference between two capacitive sensor measurements made by two different capacitive sensing electrodes at a given point in time and (2) a sum of the same two capacitive sensor measurements;
detecting a sign change in the ratio, wherein the sign change indicates a crossover point.

6. The method of claim 5, wherein determining crossover information and magnitude information by the first classifier further comprises:
determining (1) a first amount of magnitude change in capacitive sensor measurements made by a first one of the two different capacitive sensing electrodes over a period before a crossover point and a period after a crossover point, and (2) a second amount of magnitude change in capacitive sensor measurements made by a second one of the two different capacitive sensing electrodes over the same period; and
determining whether at least one of the first amount of magnitude change and the second amount of magnitude change exceeds a minimum delta threshold to qualify as a valid crossover point.

7. The method of claim 1, wherein determining derivative information by the second classifier comprises:

determining first capacitive sensor measurements from a first one of two different capacitive sensing electrodes measured over a period before and after a detected crossover point;

determining second capacitive sensor measurements from a second one of two different capacitive sensing electrodes measured over the same period;

determining derivatives of the first capacitive sensor measurements and derivatives of the second capacitive sensor measurements.

8. The method of claim 7, wherein determining derivative information by the second classifier further comprises:
determining whether one of a first average of the derivatives of the first capacitive sensor measurements and a second average of the derivatives of the second capacitive sensor measurements exceeds a minimum magnitude threshold.

9. The method of claim 7, wherein determining derivative information by the second classifier further comprises:
determining whether sign of the derivatives of the first capacitive sensor measurements and sign of the derivatives of the second capacitive sensor measurements are opposites of each other.

10. The method of claim 1, wherein determining path information by a third classifier comprises:
determining initial and end points of the gesture based on the capacitive sensor measurements from the two or more capacitive sensing electrodes;
determining estimated length of path traveled based on the initial and end points; and
comparing the estimated length of path traveled against an expected length of path traveled corresponding to the gesture.

11. The method of claim 1, wherein determining path information by a third classifier comprises:
determining initial and end points of the gesture based on the capacitive sensor measurements from the two or more capacitive sensing electrodes;
determining midpoint information along the path between the initial and end points of the gesture; and
comparing the midpoint information against an expected range corresponding to a predetermined midpoint of the gesture.

12. The method of claim 1, further comprising:
determining whether the outputs of the first, second, and third classifiers matches expected outputs corresponding to the gesture to classify whether the gesture was made by a user.

13. The method of claim 1, further comprising:
in response to classifying the gesture, triggering a user interface action corresponding to the gesture.

14. An apparatus for gesture recognition using capacitive sensing, the apparatus comprising:
two or more capacitive sensing electrodes for generating respective electric fields;
one or more processors configured for:
receiving capacitive sensor measurements made by two or more capacitive sensing electrodes over a period of time, said capacitive sensor measurements representative of disturbances to the respective electric fields generated by the two or more capacitive sensing electrodes;
determining, by a first classifier, crossover information and magnitude information from the capacitive sensor measurements;
determining, by a second classifier, derivative information from the capacitive sensor measurements;

determining, by a third classifier, path information from the capacitive sensor measurements; and classifying a gesture based on respective outputs of the first, second, and third classifiers;

wherein classifying a gesture based on outputs of classifiers further comprises:

detecting a sign change of a difference between a first capacitive sensing electrode measurement and a second capacitive sensing electrode measurement, wherein the sign change indicates a crossover point positioned between the first capacitive sensing electrode and a second capacitive sensing electrode;

determining whether a detected crossover point is valid by determining whether a magnitude change in capacitive sensor measurement made by at least one of the first and the second capacitive sensing electrode over a period of time before and/or after the crossover point exceeds a minimum delta threshold.

15. The apparatus of claim 14, further comprising a mechanical slider, wherein the two or more capacitive sensors are provided to supplement functionality of the mechanical slider or replace functionality of the mechanical slider if the mechanical slider fails.

16. One or more computer-readable non-transitory media comprising one or more instructions, for gesture recognition, that when executed on a processor configure the processor to perform one or more operations comprising:

receiving capacitive sensor measurements made by two or more capacitive sensing electrodes over a period of time, said capacitive sensor measurements representative of disturbances to the respective electric fields generated by the two or more capacitive sensing electrodes;

determining, by a first classifier, crossover information and magnitude information from the capacitive sensor measurements;

determining, by a second classifier, derivative information from the capacitive sensor measurements;

determining, by a third classifier, path information from the capacitive sensor measurements; and classifying a gesture based on respective outputs of the first, second, and third classifiers;

wherein classifying a gesture based on outputs of classifiers further comprises:

detecting a sign change of a difference between a first capacitive sensing electrode measurement and a second capacitive sensing electrode measurement, wherein the sign change indicates a crossover point positioned between the first capacitive sensing electrode and a second capacitive sensing electrode;

determining whether a detected crossover point is valid by determining whether a magnitude change in capacitive sensor measurement made by at least one of the first and the second capacitive sensing electrode over a period of time before and/or after the crossover point exceeds a minimum delta threshold.

17. The media of claim 16, wherein determining crossover information and magnitude information by the first classifier comprises:

computing a ratio for a series of points in time, wherein a value of the ratio for a given point in time comprises a ratio between (1) a difference between two capacitive sensor measurements made by two different capacitive sensing electrodes at a given point in time and (2) a sum of the same two capacitive sensor measurements;

detecting a sign change in the ratio, wherein the sign change indicates a crossover point.

18. The media of claim 16, wherein determining derivative information by the second classifier comprises:

determining first capacitive sensor measurements from a first one of two different capacitive sensing electrodes measured over a period before and after a detected crossover point;

determining second capacitive sensor measurements from a second one of two different capacitive sensing electrodes measured over the same period;

determining derivatives of the first capacitive sensor measurements and derivatives of the second capacitive sensor measurements; and determining whether a first average of the derivatives of the first capacitive sensor measurements and/or a second average of the derivatives of the second capacitive sensor measurements exceeds a minimum magnitude threshold.

19. The media of claim 16, wherein determining path information by a third classifier comprises:

determining initial and end points of the gesture based on the capacitive sensor measurements from the two or more capacitive sensing electrodes;

determining estimated length of path traveled based on the initial and end points; and comparing the estimated length of path traveled against an expected length of path traveled corresponding to the gesture.

20. The media of claim 16, wherein determining path information by a third classifier comprises:

determining initial and end points of the gesture based on the capacitive sensor measurements from the two or more capacitive sensing electrodes;

determining midpoint information along the path between the initial and end points of the gesture; and comparing the midpoint information against an expected range corresponding to a predetermined midpoint of the gesture.

* * * * *